(12) United States Patent
Zhou

(10) Patent No.: US 8,708,823 B2
(45) Date of Patent: Apr. 29, 2014

(54) GAME CONTROLLER WITH LOCATING DEVICE HAVING GUIDER TRACKS AND DISPLACEMENT SENSOR WITH TOUCH SENSOR SWITCH

(76) Inventor: Haitao Zhou, Guangdong (CN)

( * ) Notice: Subject to any disclaimer, the term of this patent is extended or adjusted under 35 U.S.C. 154(b) by 0 days.

(21) Appl. No.: 13/373,115

(22) Filed: Nov. 3, 2011

(65) Prior Publication Data

US 2013/0029763 A1     Jan. 31, 2013

(30) Foreign Application Priority Data

Jul. 30, 2011   (CN) .......................... 2011 1 0228239

(51) Int. Cl.
*A63F 9/24*      (2006.01)
*A63F 13/00*    (2014.01)

(52) U.S. Cl.
USPC .............................................. 463/37; 345/156

(58) Field of Classification Search
USPC ............... 463/36–39; 345/156, 158, 160, 184
See application file for complete search history.

(56) References Cited

U.S. PATENT DOCUMENTS

| | | | | |
|---|---|---|---|---|
| 4,692,756 A * | 9/1987 | Clark | ............................. | 345/156 |
| 4,782,327 A * | 11/1988 | Kley et al. | .......................... | 341/2 |
| 5,086,296 A * | 2/1992 | Clark | ............................. | 345/157 |
| 5,117,102 A * | 5/1992 | Mitchell | ........................ | 250/229 |
| 5,252,952 A * | 10/1993 | Frank et al. | .................... | 345/157 |
| 5,327,162 A * | 7/1994 | Soma | ............................. | 345/161 |
| 5,808,603 A * | 9/1998 | Chen | ............................. | 345/157 |
| 5,956,016 A * | 9/1999 | Kuenzner et al. | ............. | 345/156 |
| 5,990,869 A * | 11/1999 | Kubica et al. | .................. | 345/163 |
| 6,215,478 B1 * | 4/2001 | Yeh et al. | ....................... | 345/173 |
| 6,256,011 B1 * | 7/2001 | Culver | .......................... | 345/157 |
| 7,081,883 B2 * | 7/2006 | Chen | ............................. | 345/163 |
| 7,889,174 B2 * | 2/2011 | Culver | .......................... | 345/156 |
| RE42,183 E * | 3/2011 | Culver | .......................... | 345/161 |
| 2006/0111180 A1 * | 5/2006 | Cheng | ............................ | 463/36 |
| 2009/0054146 A1 * | 2/2009 | Epstein et al. | .................. | 463/38 |
| 2009/0201248 A1 * | 8/2009 | Negulescu et al. | ........... | 345/157 |
| 2011/0105231 A1 * | 5/2011 | Ambinder et al. | .............. | 463/38 |
| 2011/0275436 A1 * | 11/2011 | Kidakarn | ........................ | 463/37 |

* cited by examiner

*Primary Examiner* — Milap Shah
(74) *Attorney, Agent, or Firm* — Raymond Y. Chan; David and Raymond Patent Firm

(57) ABSTRACT

A game controller includes a controller housing, a management module and a locating device, wherein the body has a left handle and a right handle, the management module is fixed in the body for processing the data which is generated by a plurality of function buttons and the locating device, and processing communication with a game platform, the locating device links with the management module, the locating device provides for locating precise to the game character of the game.

22 Claims, 20 Drawing Sheets

GAME CONTROLLER WITH LOCATING DEVICE HAVING GUIDER TRACKS AND DISPLACEMENT SENSOR WITH TOUCH SENSOR SWITCH

BACKGROUND OF THE PRESENT INVENTION

1. Field of Invention

The present invention relates to a game controller, and more particular to a game controller, which can accurately control the act of a game character.

2. Description of Related Arts

In 1982, the game producer Nintendo developed a game controller for domestic game platform Family Computer (FC) thereof in order to support the famous game Donkey Kong selling. The game controller of the FC uses the Nintendo's patented cross-shape directional key, two action buttons labeled "A" and "B", a "start" button, and a "select" button. Such as Super Mario Bros, Contra, Double Dragon are contemporary classical game. Characteristics of these games are that the game character only has two or three acts and eight directions of motion. Therefore, the game player who uses the game controller of the Family Computer is easier to control the game character to play game. The game controller of the Family Computer provides a good experience for the game player.

Another classical game is Street Fighter which is marketed later. The domestic game platform Family Computer fails to provide a good experience for the game player because the game platform Family Computer's performance and operation does not support the game Street Fighter to work on the game platform Family Computer. Therefore, the Nintendo develops and produces another game platform called Super Nintendo Entertainment System (SNES), which improves the SNES game platform performance and the SNES's game controller. The game Street Fighter requires six action buttons, so that the SNES's game controller adds four action buttons, labeled "X", "Y", "L" and "R", wherein the four buttons "A", "B", "X", "Y" are arranged in a diamond shaped arrangement, and the action buttons "X" and "Y" are separately arranged at the end of a shoulder side of the SENS game controller. The game player who plays an old game in the new game platform will generally be satisfied with these improvements that are good enough to meet the requirements of the new game, such as Street Fighter. The game controller of the game platform SNES provides a good experience for the game player.

When the 3D game period comes, the type of game controller such as SNES's game controller fails to provide a good operation experience for 3D game. For example, in 3D platform game like Super Mario 64, using SNES's game controller can only allow the game character Mario to move forward, left, and forward-left, but nothing in between. It is a big limitation to the moving control of the game character. Some early 3D games, such as Resident Evil, overcome this limitation by assigning the Left and Right directions on the game controller to spin game character for determining moving direction, i.e. controlling the game character moving by the directional buttons of the game controller. This, however, creates its own problems as the game character is unable to move while spinning, that requires the player to stand in the same spot while changing direction. In early 3D game, the camera position cannot be adjusted, so that some camera positions would affect the game playing.

Sony produces a game controller Dual analog Controller which matches its game platform Play Station and solves the above mentioned problems occurred in the early 3D game. This type of game controller has two joysticks arranged in a symmetrical configuration with the Dual analog Controller on the left thumb position and the face buttons at the right thumb position. The left joystick controls the motion of the game character while the right joystick controls the camera for adjusting the camera position to provide convenience for playing game. The right joystick not only allows camera controlling in a third-person platform game, but also allows the player's gazing and aim controlling in a first-person shooting game (FPS). As opposed to the left joystick, it controls where the player moves. Later, the game controller employs two vibration motors for giving the game player even better experience. Until now, game controller, such as the game controller of Sony's Play Station 3 the game controller of Microsoft's XBOX 360, and etc., has two joysticks.

The drawback of the joystick is that the precision of locating is not enough for some games to the game player. The joystick is also called as joystick potentiometer, which controls the cursor or the sighting in a game through a method of angle determining speed. For example, when the game player pushes the stick to left, the cursor or the sighting moves left, wherein the more angle is pushed, the cursor or the sighting moves more faster. The cursor or the sighting's speed can be configured in the game, but this is a tough choice. If the setting of the cursor or the sighting speed is fast, then the cursor or the sighting moves fast. But, it is not good for accurately moving the cursor or the sighting in short distance. If the setting of the cursor or the sighting speed is slow, it is good for accurately controlling the cursor or the sighting. But, it will spend more time to move the cursor or the sighting to the edge of the screen. Considering the speed and precision of the cursor, one can set a value of the cursor's moving speed to meet the basic requirement of the game. However, the result is that the moving speed and the precision of the cursor both are not good enough. Or, let the game player to change the speed among several speeds which are presetting. But, the changing of the speed needs the game player to operate. Such as double pulled joystick, the game player has to pull synchronously left joystick and right joystick toward back, that will reduce the locating speed of the cursor or the sighting. The requirement of the moving speed and precision of the cursor or the sighting in the game cannot be satisfied in the present joystick at the same time. The present joystick fails to provide a good experience for the game player.

A Chinese patent application number 200810241882.5 has improved on the game controller of FPS game, which comprises a track ball for moving in-game cursor. The trackball has smaller diameter that is limited by its mounting position on the game controller. The displacement of the trackball-rotation is short, which reflects in the game that the cursor moving distance is short. It is good for locating accurately but, if the target is away from the present position of the cursor, the trackball needs to be rotated several times, and thus the aiming speed is seriously affected. If the trackball has a higher sensitivity that, when the trackball rotates a time, the cursor can move longer distance, it's difficult to accurately aim in this condition. Therefore the trackball has the same problem that cannot meet the requirement achieving the moving speed and the precision simultaneously.

Computer is another game platform. In comparison with the domestic game platform, the computer has a different control method, that is through the keyboard and the mouse to control the game character. The advantage of the keyboard and the mouse is to control the game character rapidly and accurately, but the game player requires to have a straight sitting posture that renders the game player to get tire easily, and thus there is no better experience than using the game controller. Using the game controller, you can sit in any posture you like that enables the game player does not feel tire that easy and provides a better playing experience. However, the game controller cannot be rapidly and precisely located.

SUMMARY OF THE PRESENT INVENTION

The invention is advantageous in that it provides a game controller, which provides more accurately controlling of the game character for the game player.

Another advantage of the invention is to provide a game controller which provides a rapid and precise locating device.

Another advantage of the invention is to provide a game controller which provides a new operation mode for the game player.

Another advantage of the invention is to provide a game controller, which provides a displacement sensor for the game player so that the game player can rapidly and accurately control the locating of the game character.

Another advantage of the invention is to provide a game controller, which provides a sliding frame so that the displacement sensor needn't change the orientation while the displacement sensor is being moved by the game player.

Another advantage of the invention is to provide a game controller, which provides a locating area so that the displacement sensor can be more accurately located in the located area.

Another advantage of the invention is to provide a game controller, which comprises a return device which enables the game player to find the displacement sensor easily while the game player's eyes focus on the screen.

Another advantage of the invention is to provide a game controller, which comprises a displacement device adapted to be linked with the game platform without being through the game controller.

Another advantage of the invention is to provide a game controller, wherein the game controller provides a holding device so that a displacement sensor can be secured on a finger and moved with the finger.

Another advantage of the invention is to provide a game controller, wherein the game controller can be utilized for the game which just supports the gamepad or just supports the keyboard and the mouse.

Another advantage of the invention is to provide a game controller, wherein the game controller provides a management module which processes the data sent by the displacement sensor and communicates with the game platform.

Another advantage of the invention is to provide a game controller, wherein the game controller provides better game playing experience for the game player.

Another advantage of the invention is to provide a game controller, wherein the game controller enables the user to have a good experience as using a gamepad and, at the same time, the game controller enables a rapidly and accurately locating of the game character.

Another advantage of the invention is to provide a game controller comprising a locating device which is capable of accurately and rapidly moving a cursor on a game screen.

Another advantage of the invention is to provide a game controller comprising a displacement device, which is arranged to accommodate a user's thumb in such a manner that when said user's thumb moves, said cursor moves accurately and rapidly in the video game.

Another advantage of the invention is to provide a game controller comprising a displacement device, which is simple in structure and does not substantially alter the traditional shape and construction of the controller. In other words, the manufacturing cost of the present invention can be minimized.

Additional advantages and features of the invention will become apparent from the description which follows, and may be realized by means of the instrumentalities and combinations particular point out in the appended claims.

According to the present invention, the foregoing and other objects and advantages are attained by a game controller, which comprises a controller housing, a management module and a locating device, wherein a plurality of functional buttons is set up for providing an operation of a game character of a game, wherein a management is affixed in the body to provide a processing of data produced by the function buttons or the locating device, and a communicating with a platform linked to the game controller, wherein the locating device which is linked to the management module, provides a precise locating of the game character of the game.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
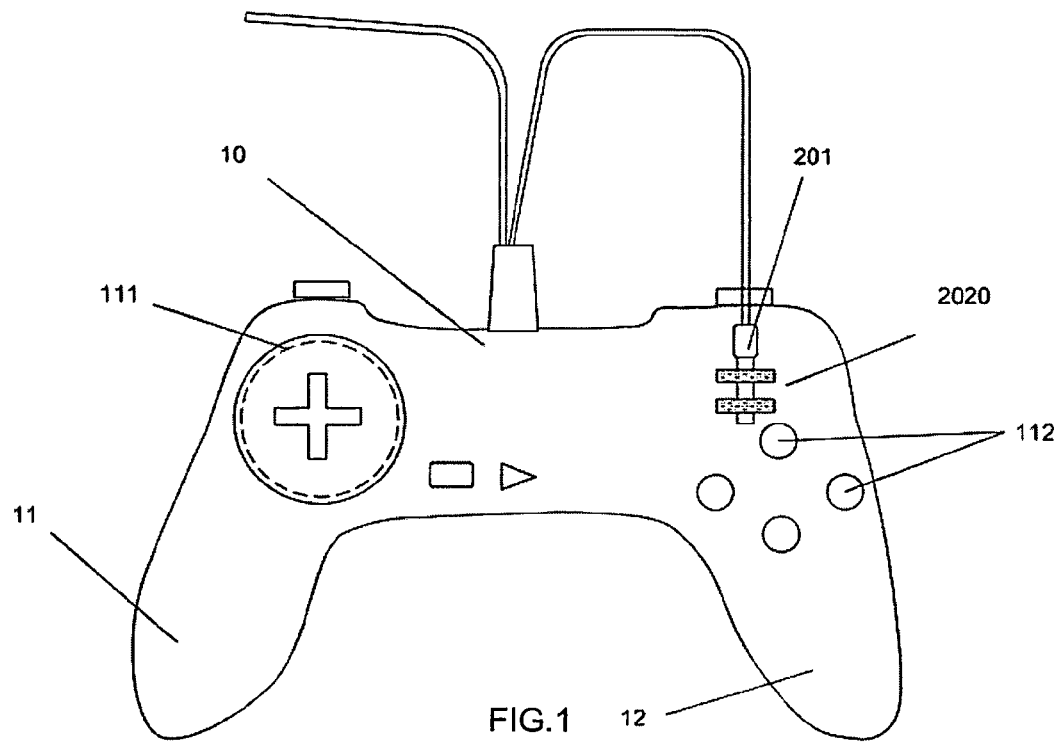
FIG. 1 is a front view of a game controller according to a preferred embodiment of the present invention, illustrating a displacement sensor of the game controller working on the right handle of the game controller and locating on the surface of the right handle.

According to the content that is disclosed in Claim and Specification of the present invention, the technical scheme of the present invention detail describes as following:

Referring to FIG. 1 of the drawing, a game controller of the present invention comprises a controller housing 10, a locating device 20 and a management module 30. The controller housing 10 comprises a plurality of functional buttons are spacedly provided on the surface of the controller housing 10 for controlling a game character of a game. The management module 30 is received in the controller housing 10 for processing data generated by the function buttons and communicating with a game platform linked to the game controller. The locating device 20 is linked to the management module 30 for providing accurately locating the game character of the game.

The controller housing 10 of the game controller further comprises a left handle 11 and a right handle 12. The left handle 11 is located on the left side of the controller housing 10. The right handle 12 is located on the right side of the controller housing 10. The left handle 11 and the right handle 12 are connected at the middle wire of the controller housing 10. The functional buttons are divided into two parts, wherein one is the direction control buttons 111 provided on the surface of the left handle of the controller housing 10, for controlling the moving direction of the game character, wherein another is the action buttons 112 separately provided on the surface of the right handle 12 of the controller housing 10 and on the back surface of the game controller for controlling action of the game character.

Figure 5:
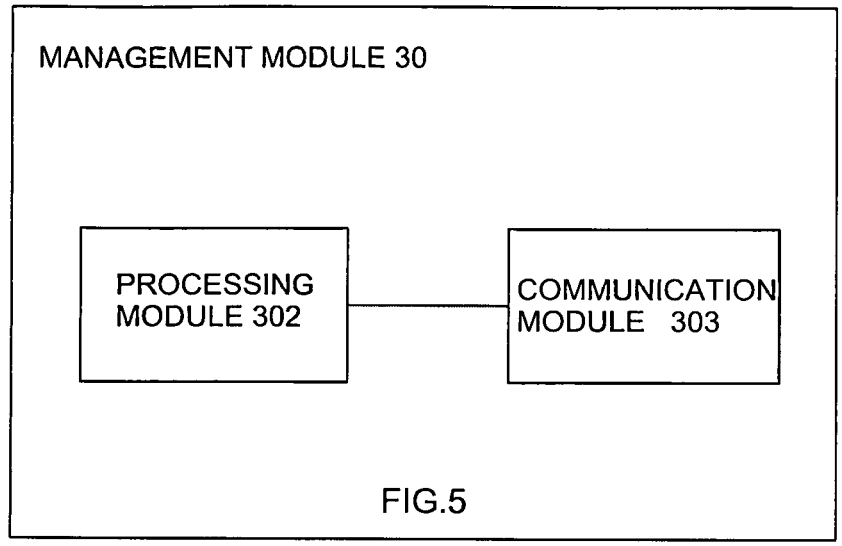
FIG. 5 is a block diagram of a management module of the game controller according the above preferred embodiment of the present invention, illustrating the structure between sub-modules of the management module.

As shown in FIG. 5, the management module 30 further comprises a processing module 302 and a communication module 303 linked with each other.

Referring to FIG. 1 of the drawing, the locating device 20 further comprises a displacement sensor 201 and a locating area 202, wherein the locating area 202 is defined on the surface of the right handle 12 of the controller housing 10. At one end of the displacement sensor 201, a securing device 2020 is provided for securing the displacement sensor 201 on a finger wherein the displacement sensor 201 moves as the finger moves in the locating area 202, so as to implement to control the game character action. In addition, the displacement sensor 201 links to the processing module 302, so that when the displacement sensor 201 begins to move, the displacement sensor 201 sends a displacement data to the processing module 302 of the management module 30. The displacement data includes the moving direction and moving distance of the displacement sensor 201.

After the management module 30 of the management module 30 receives the displacement data that is sent by the displacement sensor 201, the management module 30 processes and encapsulates the displacement data and generates formatted displacement data which is identified by the game platform. Then, the formatted displacement data of the displacement sensor 201 is sent to the communication module 303. The communication module 303 sends the formatted displacement data of the displacement sensor 201 to the game platform. Through the game platform, the current place of the displacement sensor 201 would be shown on the display device linked to the game platform.

During the moving of the displacement sensor 201, the displacement sensor 201 continually sends the displacement data of the displacement sensor 201 to the management module 30 and the management module 30 continually processes the displacement data of the displacement sensor 201 and generates the formatted displacement data. The management module 30 sends the formatted displacement data to the game platform, wherein the current place of the displacement sensor is showed on the display device through the game platform. Therefore, the moving path of the displacement sensor 201 can be shown on the display device rapidly and precisely.

When the displacement sensor 201 stops moving, the displacement sensor 201 stops sending the displacement data of the displacement sensor 201 to the management module 30. The management module 30 stops sending the formatted displacement data of the displacement sensor 201 to the game platform, and then the display device shows the position when the displacement sensor 201 stops moving.

When the displacement sensor 201 is in a still condition, the displacement sensor 201 does not send the displacement data of the displacement sensor 201 to the management module 30. The position of the displacement sensor 201 would not change during the still condition of the displacement sensor 201. When the game character moves, the direction control buttons 111 send direction data to the management module 30. The management module 30 processes the direction data, encapsulates the direction data, and generates the formatted direction data, so that the game platform can identify the formatted direction data, and then the formatted direction data are sent to the communication module 303. The communication module 303 sends the formatted direction data to the game platform. The action data is sent by the action control buttons, and that the management module 30 also processes the action data, generates the formatted action data, and sends to the game platform. So that the game controller can accurately control the game character.

The holding device 2020 further comprises two resilient rings, wherein the finger is place between the two resilient rings and held between the two resilient rings for fixing the displacement sensor 201. The holding device 2020 could be an elastic circle too, letting the finger passing through the elastic circle for holding the displacement sensor 201 in position.

A magnetic device is added on the locating area 202 and, at the same time, an iron plate is fixed on the displacement sensor 201, so as to prevent the displacement sensor 201 dropping from the locating area 202. Using the iron made locating area 202 and the magnetic device fixed on the displacement sensor 201 can achieve the same result.

According to a First Personal Shooting (FPS) game, the workable method of the locating device 20 is illustrated. In the FPS game, the locating device 20 controls a weapon cursor of a game character, so that the weapon can rapidly and accurately locate the firing target. Therefore, at the beginning of the game, the weapon cursor of the game character shows in the middle of a display device which is controlled by the locating device 20, and the display device and the game controller are separately linked to the same game platform. The weapon cursor in-game movement is accompanied by the displacement sensor 201 moving cursor. When the displacement sensor 201 starts to move on the locating area 202, the displacement sensor 201 which is scanned in the locating area 202 sends the displacement data to the processing module 302 of the management module 30. The processing module 302 processes the displacement data and generates the formatted displacement data, and then the formatted displacement data are sent to the communication module 303.

After the communication module 303 receives the formatted displacement data, the formatted displacement data will be sent to the game platform. After the game platform processed, the display device which is linked to the game platform shows the position thereof after the cursor has been moved.

When the displacement sensor 201 keeps moving on the locating area 202, the displacement sensor 201 keeps sending the displacement data of the displacement sensor 201 to the management module 30. After the management module 30 processes and generates the formatted displacement data, the formatted displacement data of the displacement sensor 201 are sent to the display device that is linked to the game platform through the game platform linked to the game controller. Therefore, the display device can rapidly and accurately show the moving path of the weapon cursor of the game character used by the displacement sensor 201 controlled. When the displacement sensor 201 suddenly stops moving, the displacement sensor 201 stops sending the displacement data to the management module 30 and the management module 30 stops sending the formatted displacement data of the displacement sensor 201 to the game platform. The display device shows the weapon cursor position and the displacement sensor 30 stops moving the place. So that the displacement sensor can achieve rapidly and precisely controlling of the weapon cursor of the game character being used.

Figure 15:
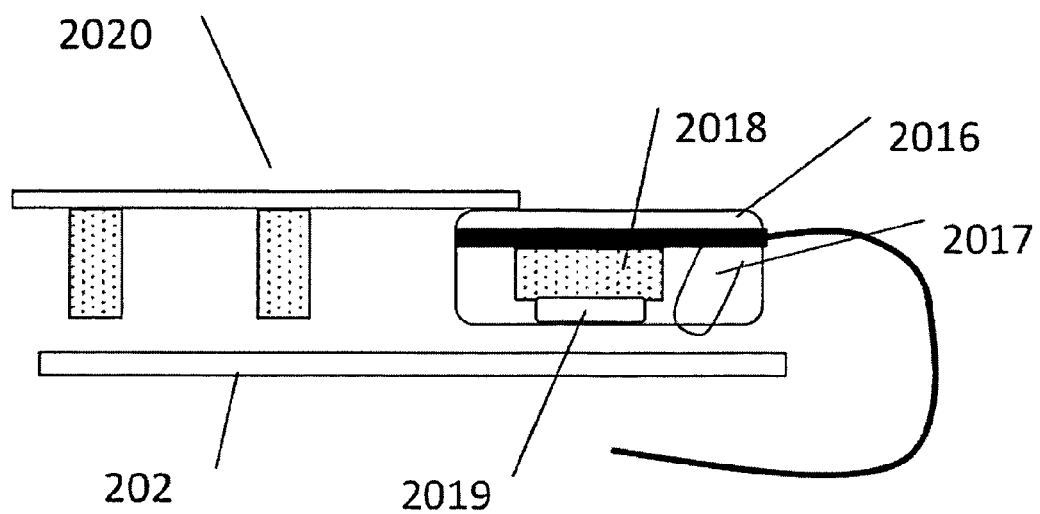
FIG. 15 is side view of the game controller according to the above alternative mode of the above preferred embodiment of the present invention, illustrating the structure of the displacement sensor.

The displacement sensor 201 of the locating device 20 of the game controller, preferably, is a photoelectric sensor, as shown in FIG. 15. The photoelectric sensor comprises a casing 2016, an optical sensor 2018, an optical lens 2019, and a light source 2017. The optical sensor 2018, the optical lens 2019 and the light source 2017 are received in the casing 2016. The light source 2017 is affixed on the back or left side or right side of the optical sensor 2018. The optical sensor 2018 is linked to the management module 30. The bottom surface of the casing 2016 is a work surface, having an opening in the middle thereof, so that when the light produced by the light source 2017 irradiates on the locating area 202, the optical sensor 2018 can receive reflected light reflected by the locating area 202 through the optical lens 2019. When the casing 2016 is working, its work surface is in contact with the locating area 202. The light source 2019 is preferably a LED or a laser source. The optical sensor 2018 obtains moving direction and distance thereof for analyzing the scanned surface image of the locating area. If the optical sensor 2018 is a laser optical sensor, some kinds of the laser optical sensor can form an image without the optical lens.

Figure 2:
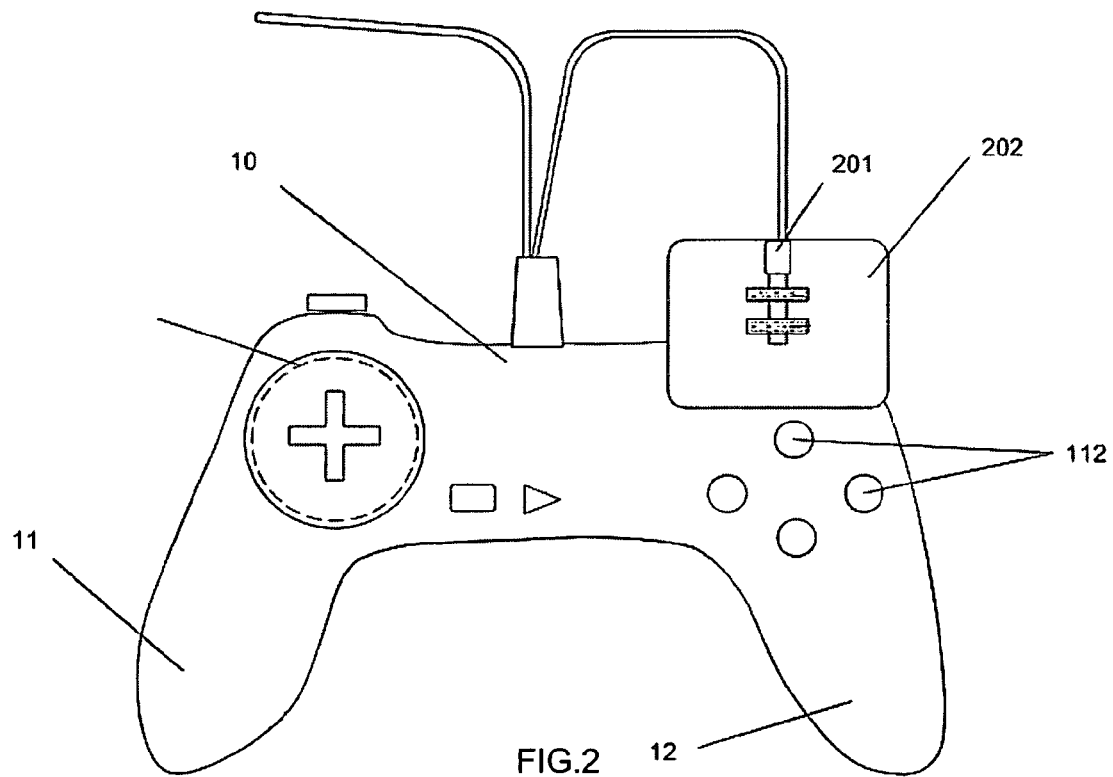
FIG. 2 is a front view of a game controller according to an alternative mode of the above preferred embodiment of the present invention, illustrating a displacement sensor of the game controller located on a locating area.
Figure 3:
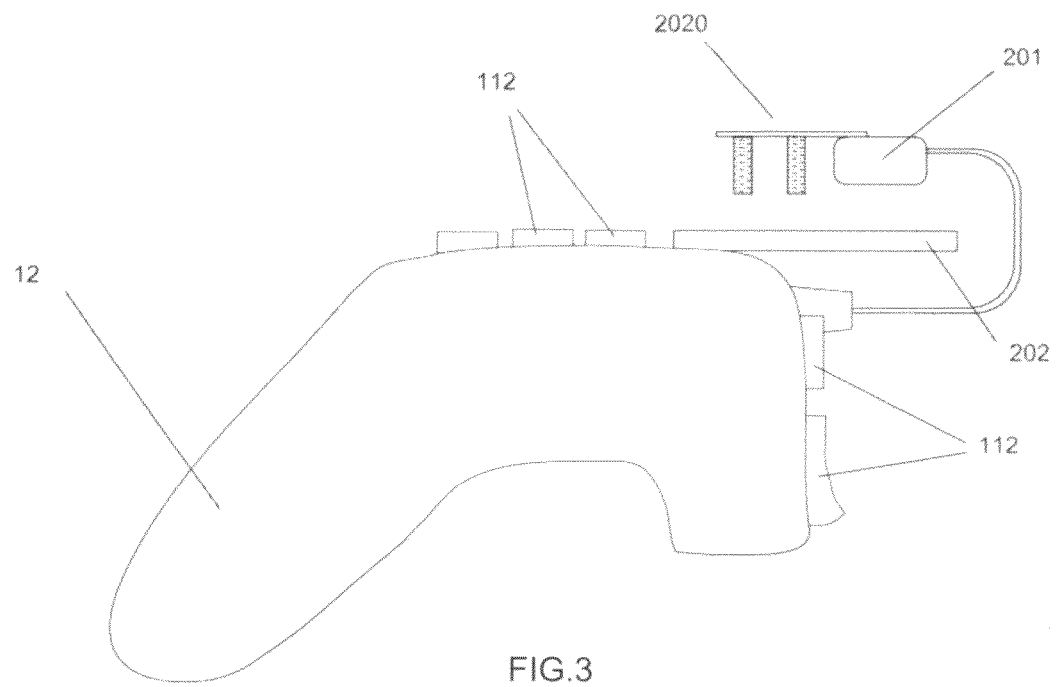
FIG. 3 is a side view of a game controller according to the above alternative mode of the above preferred embodiment of the present invention, illustrating the structure of the locating area and the displacement sensor.

Referring to FIGS. 2 and 3 of the drawings, an alternative mode of the preferred embodiment is illustrated, wherein the locating area 202 of the locating device 20 of the game controller locates at the end of the right handle 12 of the controller housing 10 of the game controller. One end of the locating area 202 of the locating device 20 is connected with the surface of the right handle 12 of the controller housing 10 while the other end is extended out of the controller housing 10 of the game controller, so that the displacement sensor 201 can rapidly and accurately locate on the locating area 202. Preferably, the locating area 202 of the locating device 20 has a rectangular surface. When the displacement sensor 201 of the locating device is, preferably, a photoelectric sensor, the displacement sensor 201 should better receive the light generated by itself and reflect back to the displacement sensor 201, so that the precision of the locating device 20 is improved.

Figure 4:
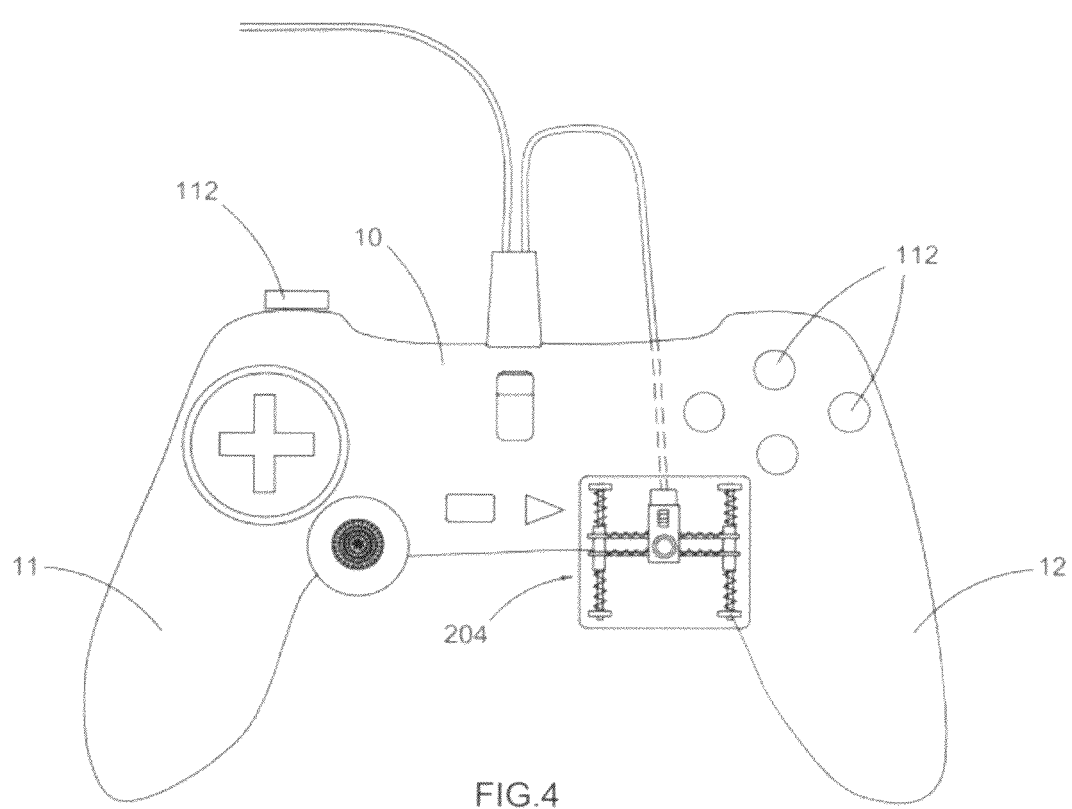
FIG. 4 is a perspective view of a game controller according to an alternative mode of the above preferred embodiment of the present invention, illustrating a locating area located in an alternative place of the game controller.

Referring to FIG. 4 of the drawing, another alternative mode of the preferred embodiment is illustrated, wherein the locating area 202 of the locating device 20 of the game controller is located on the right handle 12 of the controller housing 10. In other words, that position is the right stick position of the traditional gamepad which has two sticks. The adjacent side of the locating area 202 connects with the right handle 12 of the controller housing 10. The other adjacent side of the locating area 202 is extended out of the controller housing 10. Preferably, the locating area 202 of the locating device 20 has a rectangular surface. When the displacement sensor 201 of the locating device is, preferably, a photoelectric sensor, the displacement sensor 201 could better receive the reflected light generated by itself, so that the accurateness of the locating device 20 is improved.

Figure 6:
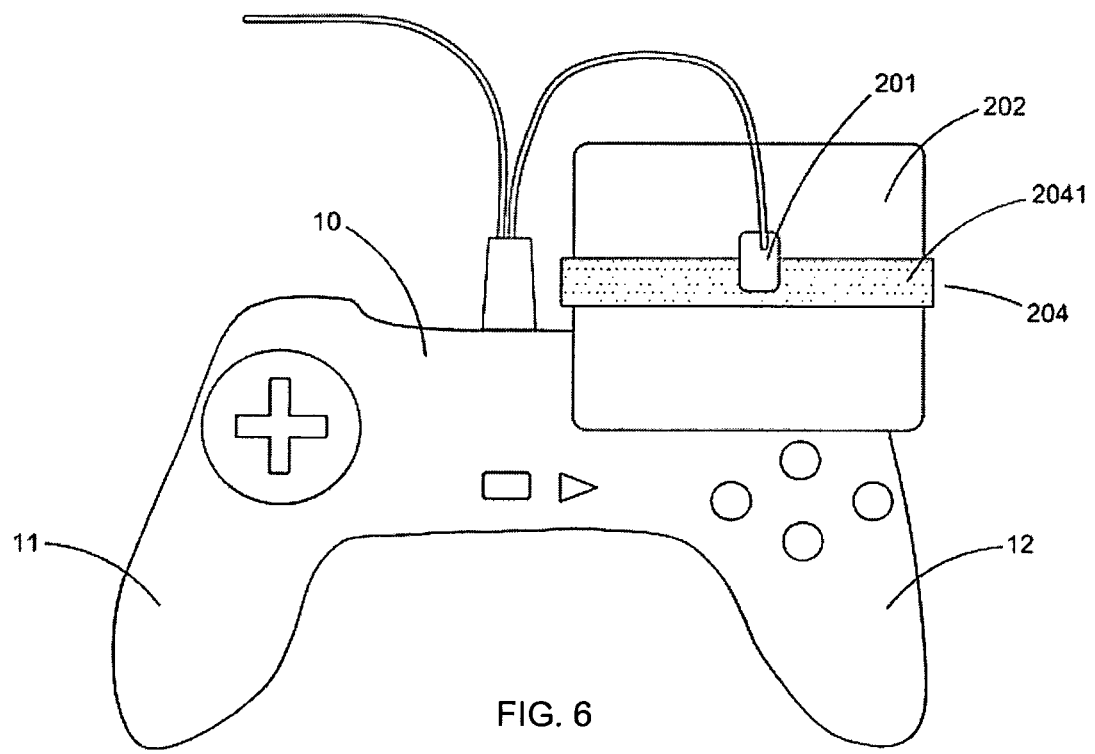
FIG. 6 is a front view of a game controller according to an alternative mode of the above preferred embodiment of the present invention, illustrating a displacement sensor located on a sliding frame of the game controller.

Referring to FIG. 6 of the drawing, an alternative mode of the preferred embodiment is illustrated, wherein the locating device 20 of the game controller further comprises a displacement sensor 201, a locating area 202 and a sliding frame 204, wherein the sliding frame 204 is provided on the locating area 202 and the displacement sensor 201 is mounted on the sliding frame 204. Preferably, the locating area 202 has a rectangular surface. The sliding frame 204 further comprises a first track 2041, which has both ends bent toward the back of the locating area 202 to form a "U" shape structure for clamping two opposite edge of the locating area 202, so that the sliding frame 204 can move along with the edge of the locating area 202. The displacement sensor 201 is mounted on the sliding frame 204 and the displacement sensor 201 slides along with the sliding frame 204.

Preferably, the displacement sensor 201 is a photoelectric sensor. When the displacement sensor 201 moves from a centre of the locating area 202 to a lower right corner, the displacement sensor 201 moves along with the sliding frame 204 toward the right side edge of the locating area 202. At the same time, the sliding frame 204 moves toward a lower side of the locating area 202 along with the edge of the locating area 202. When the displacement sensor 201 moves to the right edge of the locating area 202 and the sliding frame 204 moves to the lower right corner, the locating sensor 201 is already moved to the lower right corner of the locating area 202. The displacement sensor 201 which is mounted on the sliding frame 204 can be moved freely on the locating area 202 and be rapidly and accurately located at any position in the locating area 202. The moving path of the displacement sensor 201 in the locating area 202 would be sent to the game platform by the management module 30, which is then shown on the display device linked to the game platform. The sliding frame 204 provided on the locating area 202 enables an orientation of the displacement sensor 201 being not changed, that affects the accurateness of the locating. Preferably, the displacement sensor is a photoelectric sensor.

Figure 7:
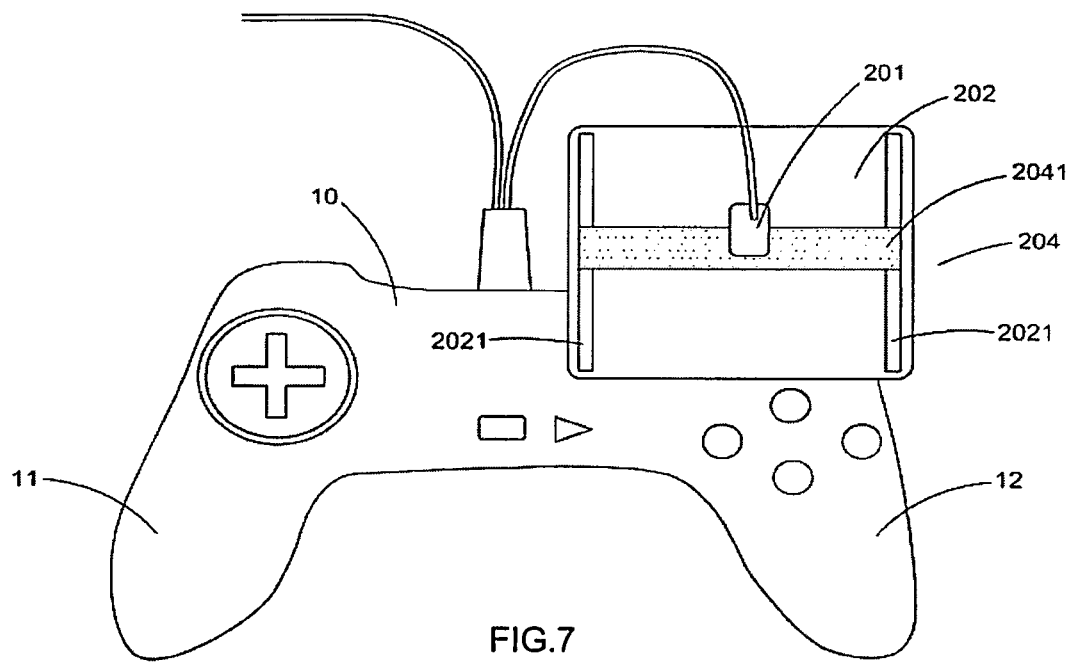
FIG. 7 is a front view of a game controller according to an alternative mode of the above preferred embodiment of the present invention, illustrating an alternative sliding frame on the locating area.
Figure 8:
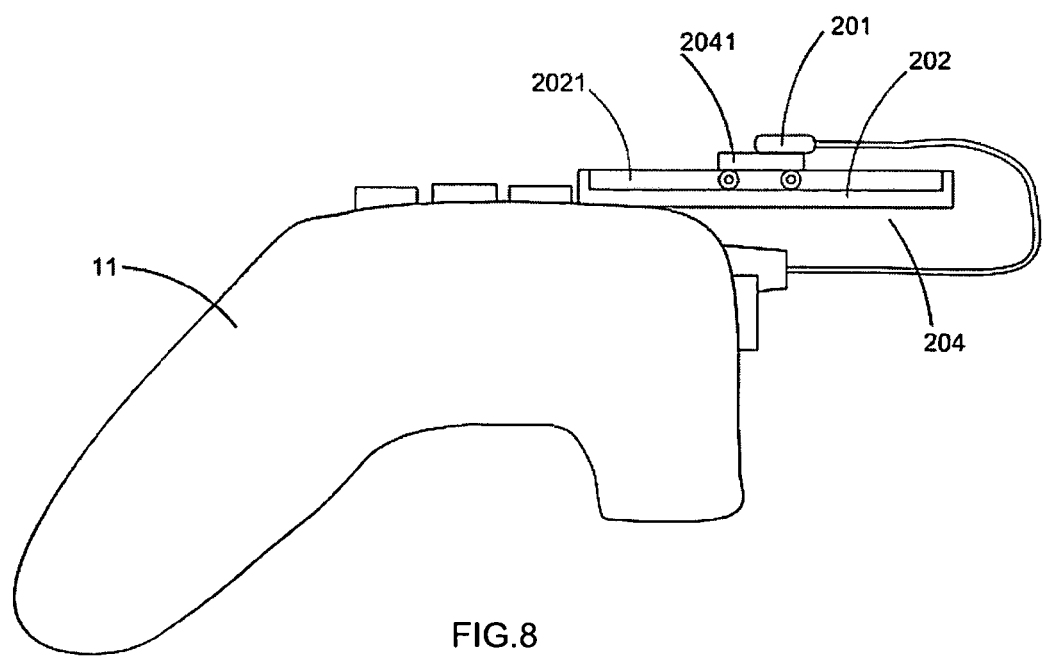
FIG. 8 is a side view of the game controller according to the above alternative mode of the above preferred embodiment of the present invention, illustrating a sliding track moves on a sliding slot of the locating area.

Referring to FIGS. 7 and 8 of the drawings, an alternative mode of the preferred embodiment of the present invention is illustrated, wherein the locating device 20 of the game controller further comprises a displacement sensor 201, a locating area 202 and a sliding frame 204, wherein the sliding frame 204 is mounted on the locating area 202 and the displacement sensor 201 is mounted on the sliding frame 204. Preferably, the locating area has a rectangular surface and two sliding slots 2021 are provided on two opposite side edges of the locating area 202 respectively. The two sliding slots 2021 are parallel and have a length the same as the length of the side of the locating area 202.

The sliding frame 204 further comprises a first guider track 2041 and a movement device is provided at the both ends thereof. More preferably, the movement device comprises at least a wheel for mounting the two ends of the first guider track 2041 in the sliding slot 2021 of the opposite side edges of the locating area 202, so that the first guider track 2041 can move from one side to another side along the locating area 202.

The displacement sensor 201 is provided on the first guider track 2041 in order to move along the first guider track 2041. Preferably, the displacement sensor 201 is a photoelectric sensor. When the displacement sensor 201 moves from a centre of the locating area 202 to a lower right corner of the locating area 202, the displacement sensor 201 moves to a right edge of the locating area 202 along the sliding frame 204, and, at the same time, the sliding frame 204 moves to a lower edge of the locating area 202 along the two sliding slots 2021 of the locating area 202. When the displacement sensor 201 is located at the right edge of the locating area 202 and the sliding frame 204 is located the lower edge of the locating area 202, the displacement sensor 201 is already located at the lower right corner of the locating area 202. The displacement sensor 201 is mounted on the sliding frame 204 in such a manner that the displacement is able to move freely in the locating area 202 and locate rapidly and accurately at any position of the locating area 202.

The moving path of the displacement sensor 201 in the locating area 202 is sent to the game platform through the management module 30 and shown on the display device linked to the game platform. Due to the sliding frame 204 provided on the locating area 202, the orientation of the displacement sensor 201 would not change so as to affect the locating accurateness. The orientation of the displacement sensor 201 is the positive direction of the Y axis of a Cartesian coordinate system in where the displacement sensor 201 located. In other words, when the orientation of the displacement sensor 201 is same as the positive direction of the Y axis of the Cartesian coordinate system of the display device and the displacement sensor 201 moves along the positive direction of the Y axis of the Cartesian coordinate system, the weapon cursor of the game character controlled by the displacement sensor 201 also moves along the positive direction of the Y axis as shown on the display device. If the orientation of the displacement sensor 201 is the negative direction of the Y axis of the Cartesian coordinate system of the display device and the displacement sensor 201 moves along the positive direction of the Y axis of the Cartesian coordinate system, the weapon cursor of the game character controlled by the displacement sensor 201 will move along the negative direction of the Y axis as shown on the display device.

Figure 9:
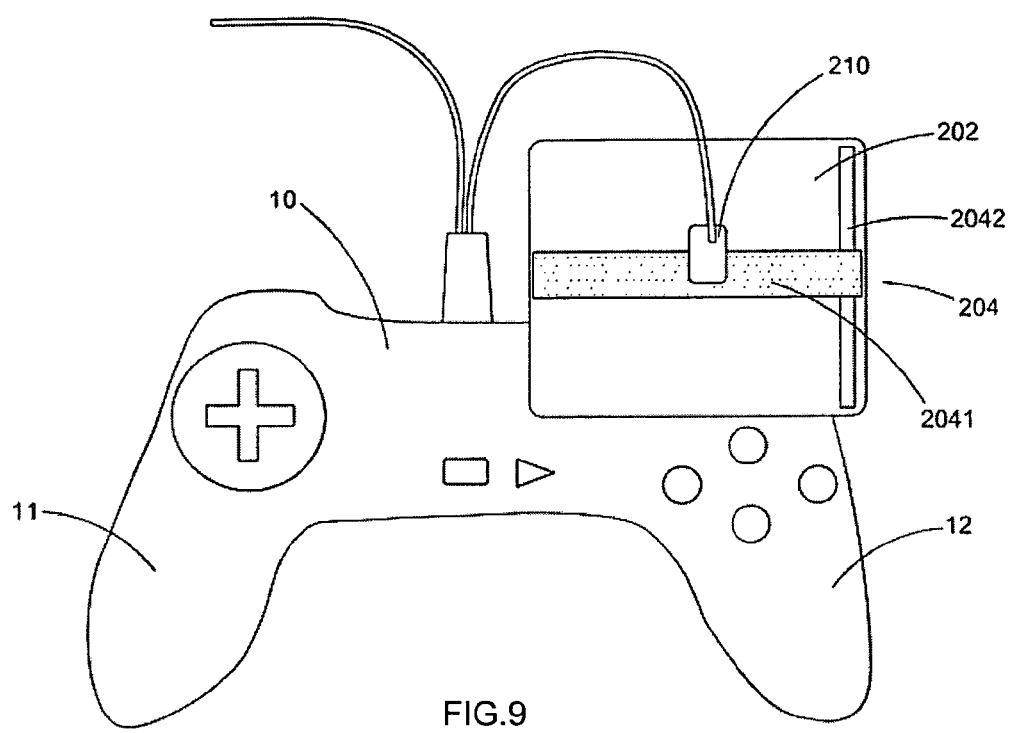
FIG. 9 is a front view of a game controller according to an alternative mode of the above preferred embodiment of the present invention, illustrating an alternative sliding frame on the locating area.

Referring to FIG. 9 of the drawing, another alternative mode of the preferred embodiment of the present invention, wherein the locating device 20 of the game controller further comprises a displacement sensor 201, a locating area 202 and a sliding frame 204, wherein the sliding frame 204 is mounted on the locating area 202 and the displacement sensor 201 is mounted on the sliding frame. Preferably, the locating area 202 has a rectangular surface. The sliding frame 204 further comprises a first guider track 2041 and a second guider track 2042, wherein the second guider track 2042 is located at a side edge of the locating area 202. One end of the first guider track 2041 connects with the second guider track 2042, and the other end of the first guider track 2041 is placed on the surface of the locating area 202. The first guider track 2041 and the second guider track are perpendicular with each other. In addition, the second guider track 2042 has a linear bearing so that the first guider track 2041 can move along the second guider track 2042. The displacement sensor 201 is affixed on the first guider track 2041 of the sliding frame 204 and can move along the first guider track 2041. Preferably, the displacement sensor 201 is a photoelectric sensor. Since the displacement sensor 201 is affixed on the sliding frame 204, it can move freely in the locating area 202 and rapidly and accurately move to any position of the locating area 202. The moving path of the displacement sensor 201 on the locating area 202 is sent to the game platform through the management module 30, and shown on the display device. The locating area 202 provided on the sliding frame 204 substantially renders the orientation of the displacement sensor 201 to remain no change, to affect he locating accurateness.

Figure 10:
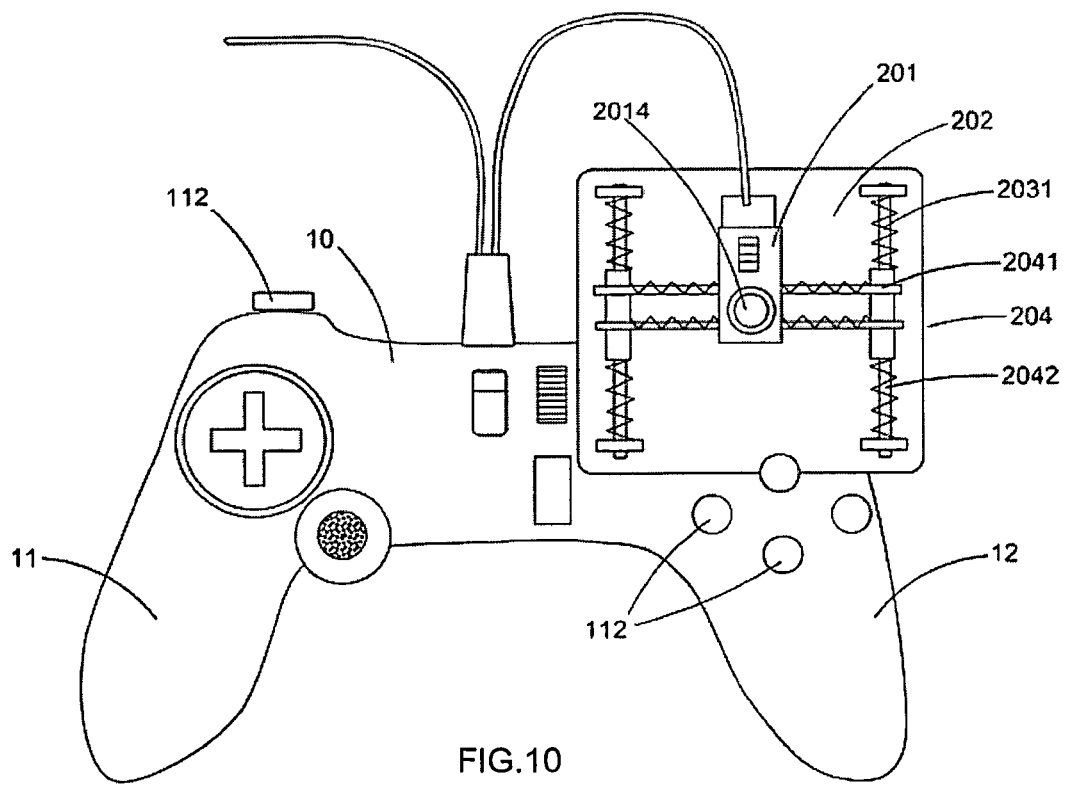
FIG. 10 is front view of a game controller according to an alternative mode of the above preferred embodiment of the present invention, illustrating a locating device structure with a reversion device.

Referring to FIG. 10 of the drawing, an alternative mode of the preferred embodiment of the present invention, wherein the locating device 20 of the game controller further comprises a displacement sensor 201, a locating area 202 and a sliding frame 204, wherein the sliding frame 204 is mounted on the locating area 202 and the displacement sensor 201 is mounted on the sliding frame 204. Preferably, the locating area 202 has a rectangular surface. The sliding frame 204 further comprises a first guider track 2041 and two parallel second guider tracks 2042, wherein two second guider tracks 2042 are mounted on two side edges of the locating area 202. Two ends of the first guider track 2041 are connected with two second guider tracks 2042 respectively to form a "H" shape structure, so that the first guider track 2041 can be moved along the two parallel second tracks 2042. The displacement sensor 201 is mounted on the first track 2041, so that the displacement sensor 201 can be moved along the first guider track 2041.

Preferably, the displacement sensor 201 is a photoelectric sensor. When the displacement sensor 201 moves to an upper-left corner of the locating area 202, the displacement sensor 201 moves to a left edge of the locating area 202 along the first guider track 2041, and, at the same time, the first guider track 2041 moves to the upper edge of locating area 202 along the two parallel second tracks 2042. When the displacement sensor 201 is located at the left edge of the locating area 202 along the first guider track 2041, the first guider track 2041 is located at the upper edge of the locating area 202. Then, the displacement sensor 201 is located at the upper-left corner of the locating area 202.

The displacement sensor 201 mounted on the sliding frame 204 can be moved freely within the locating area 202 and rapidly and accurately located at any position within the locating area 202. The moving path of the displacement sensor 201 within the locating area 202 is sent to the game platform through the management module 30 and shown on the display device. The sliding frame provided on the locating area 202 substantially renders, the orientation of the displacement sensor 201 to remain no change so as to affect the locating accurateness.

Figure 11:
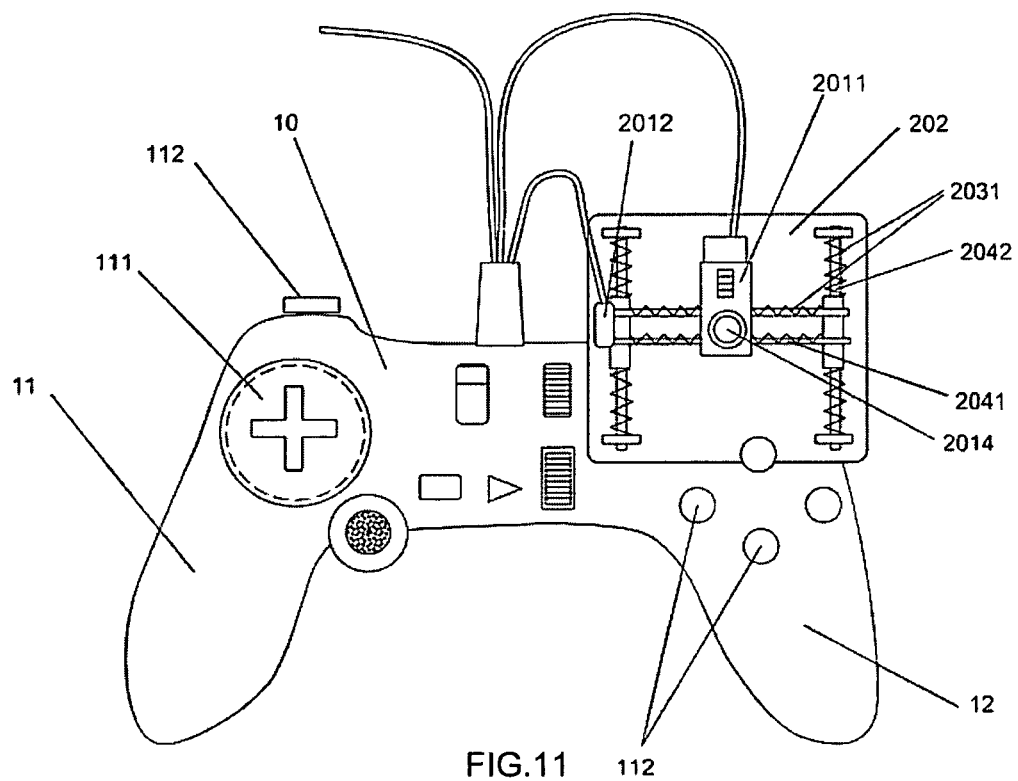
FIG. 11 is front view of a game controller according to an alternative mode of the above preferred embodiment of the present invention, illustrating an alternative scan method of a displacement sensor.

Referring to FIG. 11 of the drawings, another alternative mode of the preferred embodiment of the present invention, wherein the locating device 20 of the game controller is provided at one end of the right handle 12 of the controller housing 10 of the game controller 112. The locating device 20 further comprises a displacement sensor 202, a locating area 202 and a sliding frame 204, wherein the sliding frame 204 is mounted on the locating area 202 and the displacement sensor 201 is mounted on the sliding frame 204. The sliding frame 204 further comprises a first guider track 2041 and two parallel tracks 2042, wherein two second guider tracks 2042 are located at two opposite side edges of the locating area 202 respectively and the two ends of the first guider track 2041 are connected with two second guider tracks 2042 respectively to form a "H" shape structure, so that the first guider track 2041 can be moved along the two second guider tracks 2042. The locating area 202 is located between two second guider tracks 2042.

The displacement sensor 201 further comprises a X axis displacement sensor 2011 and a Y axis displacement sensor 2012. The X axis displacement sensor 2011 and the Y axis displacement sensor 2012 are respectively linked to the management module 30, wherein the Y axis displacement sensor 2011 is mounted on an end of the first guider track 2041 that connects with the second guider track 2042 for scanning the displacement of the first guider track 2041 on the second guider track 2042. The scanned result is sent to the management module 30. The X axis displacement sensor 2011 is mounted on the first guider track 2041 enables it to be moved along the first guider track 2041 for scanning the displacement of the X axis displacement sensor 2011 on the first guider track 2041, and then the scanned result is sent to the management module 30. The X axis displacement sensor 2011 and the Y axis displacement sensor 2012 are respectively linked to the processing module 302 of the management module 30.

When the displacement sensor 201 moves from a centre of the locating area 202 to an upper-left corner, the X axis displacement sensor 2011 is continuously sending the displacement data of the X axis displacement sensor 2011 to the processing module 302 of the management module 30. The Y axis displacement sensor 2012 is continuously sending the displacement data of the Y axis displacement sensor 2012 to the processing module 302 of the management module 30. When the processing module 302 receives the displacement data sent from the X axis displacement sensor 2011 and the Y axis displacement sensor 2012 respectively, the two displacement data are put into a group, and then that group of the two displacement data is detected to match for determining whether they are sent at the same time. If the displacement data of this group were not sent at the same time, abandon this group of displacement data, and then continue to detect the next group of displacement data. If the displacement data of such group were sent at the same time, the processing module 302 processes the group of displacement data and generates a formatted displacement data of the X axis displacement sensor 2011 and a formatted displacement data of Y axis displacement sensor 2012, which are processed to generate a formatted displacement data of the displacement sensor 201. After that the displacement data of the displacement sensor 201 are sent to the communication module 303 of the management module 30. After the communication module 303 receives the formatted displacement data of the displacement sensor 201 sent by the processing module 302, the formatted displacement data of the displacement sensor 201 is sent to the game platform, wherein after they are processed by the game platform, a moved position of the weapon cursor is shown on a display device linked to the game platform.

When the X axis displacement sensor 2011 is moved to a left side edge of the locating area 202 along the first guider track 2041, at the same time, the first guider track 2041 is moved to an upper edge of the locating area 202 along two second guider tracks 2042, and, therefore, the Y axis displacement sensor 2012 is also moved to the upper edge of the locating area 202. During the moving of the X axis displacement sensor 2011 and Y axis displacement sensor 2012, the X axis displacement sensor 2011 and Y axis displacement sensor 2012 continuously send the displacement data to the processing module 302 of the management module 30 respectively. The processing module 302 continuously processes the displacement data which are respectively sent from the X axis displacement sensor 2011 and the Y axis displacement sensor 2012 and generates the formatted displacement data of the X axis displacement sensor 2011 and the formatted displacement data of the Y axis displacement sensor 2012. Then, the above formatted displacement data are continuously processed to finally generate the formatted displacement data of the displacement sensor 201. Thereafter, the formatted displacement data of the displacement sensor 201 is sent to the communication module 303. The communication module 303 continuously sends the formatted displacement data of the displacement sensor 201 to the game platform and then displayed on the display device linked to the game platform. The display device displays the moving path of the weapon cursor of the game character controlled by the displacement sensor 201. The game player can rapidly and accurately control the weapon cursor of the game character used by the displacement sensor 201.

When the X axis displacement sensor 2011 is moved to the left edge of the locating area 202 along the first guider track 2041 and the first guider track 2041 is moved to the upper edge of the locating area 202, the X axis displacement sensor 2011 has been already moved to the upper-left corner of the locating area 202. The displacement sensor 201 mounted on the sliding frame 204 is able to be moved freely within the locating area 202 and rapidly and accurately located any position within the locating area 202. The sliding frame mounted on the locating area 202 would cause the orientation of the displacement sensor 201 to be remained no change, so as to affect the locating accurateness of the displacement sensor 201. Preferably, the X axis displacement sensor 2011 and the Y axis displacement sensor are photoelectric sensors. Preferably, the photoelectric sensor is a granting sensor.

When the X axis displacement sensor 2011 is moved along the first guider track 2041 and the first guider track 2041 does not move along two second guider tracks 2042, the X axis displacement sensor 2011 sends displacement data of the X axis displacement sensor 2011 to the processing module 302 of the management module 30 and the Y axis displacement sensor 2012 does not send displacement data of the Y axis displacement sensor 2012. In this case, the processing module 302 of the management module does not process matched detecting but processes the displacement data of the X axis displacement sensor 2011 directly and generates formatted displacement data of the X axis displacement sensor 2011. The processing module 302 doesn't receive the displacement data of the Y axis displacement sensor 2012, so the formatted displacement data of the X axis displacement sensor 2011 is sent to the communication module 303 of the management module 30. The communication module 303 sends the formatted displacement data of X axis displacement sensor 2011 to the game platform and displays on the display device linked to the game platform. On the display device, the weapon cursor of the game character being used is displayed moving along with the X axis.

When the first guider track 2041 moved along the two second guider tracks 2042, the Y axis displacement sensor 2012, following the first guider track 2041, moves along the two second guider tracks 2042. When the X axis displacement sensor 2011 does not move along the first guider track 2041, the Y axis displacement sensor 2012 sends displacement data to the processing module 302 of the management module 30 and the X axis displacement sensor 2011 doesn't send displacement data of the X axis displacement sensor 2011 to the processing module 302 of the management module 30. In this case, the processing module 302 of the management module 30 does not process matched detecting and processes the displacement data of the Y axis displacement sensor 2012 directly and generates formatted displacement data of the Y axis displacement sensor 2012. The X axis displacement sensor 2011 does not send displacement data of the X axis displacement sensor 2011 to the processing module 302 of the management module 30, so the formatted displacement data of Y axis displacement sensor 2012 is sent to the communication module 303 of the management module 30. The communication module 303 sends the formatted displacement data of the Y axis displacement sensor 2021 to the game platform and displays on the display device linked to the game platform. The display device displays the weapon cursor of the game character moving along the Y axis.

Figure 12:
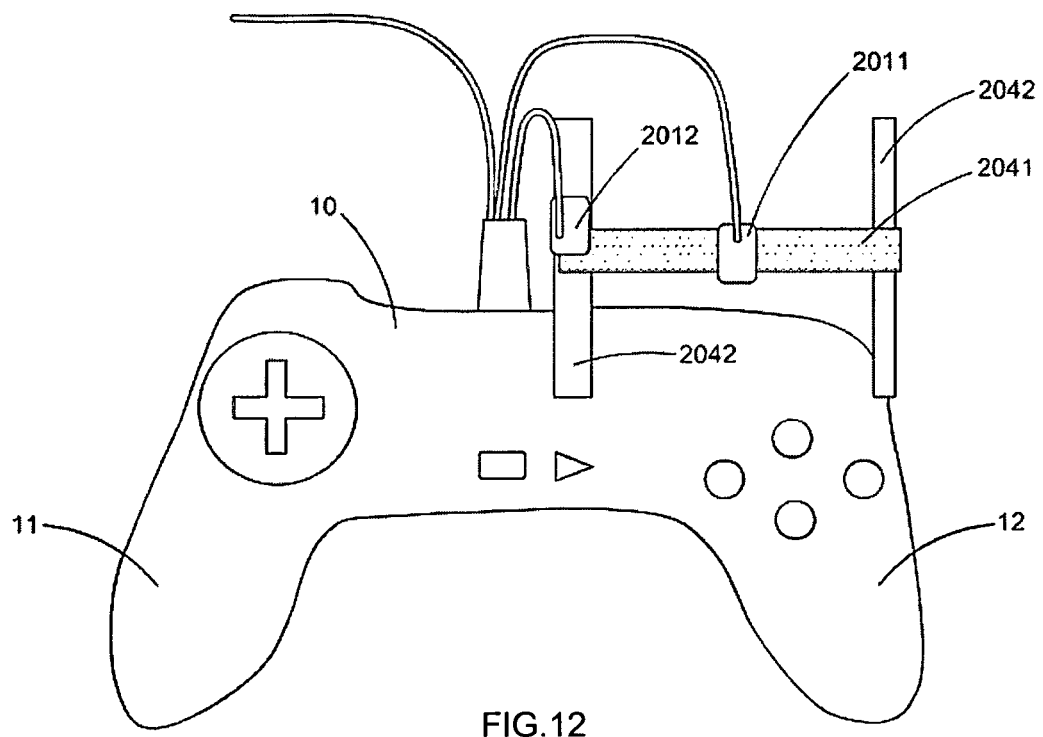
FIG. 12 is front view of a game controller according to an alternative mode of the above preferred embodiment of the present invention, illustrating a sliding frame structure using another alternative scan method.

When the displacement sensor 201 employs a scanning method as shown in FIG. 11 for locating, the displacement sensor 201 further comprises a X axis displacement sensor 2011 and a Y axis displacement sensor 2012, wherein the X axis displacement sensor 2011 and the Y axis displacement sensor 2012 are respectively linked to management module 30 and the X axis displacement sensor 2011 and the Y axis displacement sensor 2012 respectively scan the first guider track 2041 and the second guider track 2042 in order to confirm the displacement data of the X axis displacement sensor 2011, so that it's not necessary to provide another plane as the locating area 202, The locating area is provided between the two second guider tracks 202, as shown in FIG. 12. In other words, if a sliding frame structure as shown in FIG. 12 is employed, simply by utilizing the sliding frame 204 and the displacement sensor 201, the weapon cursor of the game character can also locating a rapidly and accurately. In this structure, the locating device comprises the sliding frame 204 and the displacement sensor which is mounted on the sliding frame.

Figure 13:
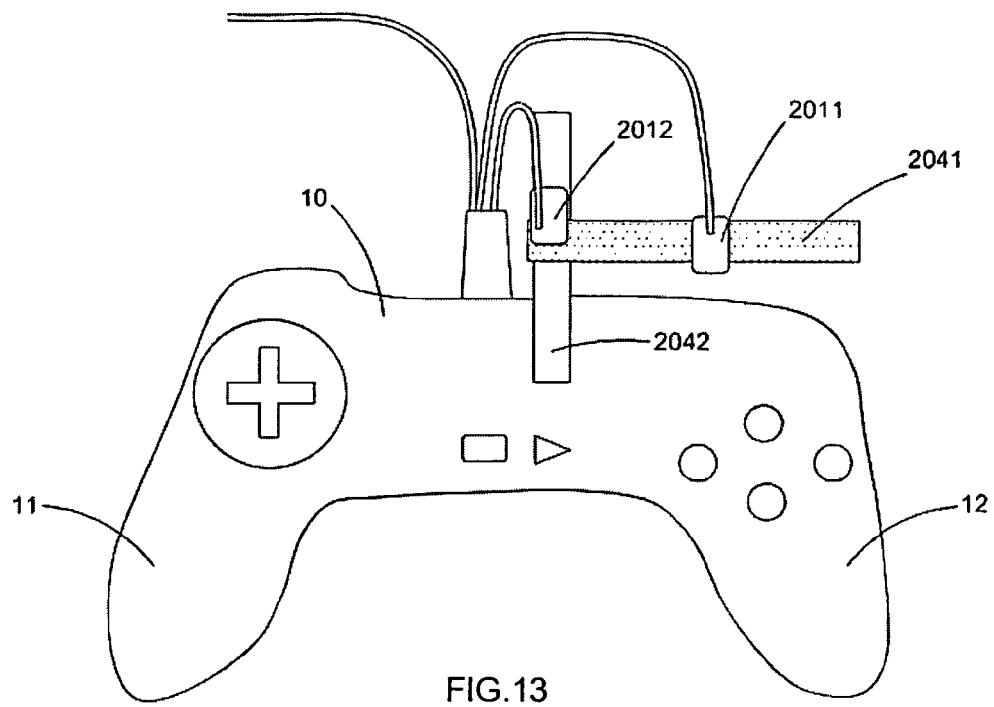
FIG. 13 is front view of a game controller according to an alternative mode of the above preferred embodiment of the present invention, illustrating another alternative sliding frame structure.

Referring to FIG. 13 of the drawing, the locating device 20 of the game controller is provided on one end of the right handle 112 of the controller housing 10 of the game controller. The locating device 20 further comprises a displacement sensor 201, a locating area 202 and a sliding frame 204, wherein the sliding frame 204 is provided on the locating area 202 and the displacement sensor 201 is provided on the sliding frame 204. The sliding frame further comprises a first guider track 2041 and a second guider track 2042, wherein the second guider track 2042 is mounted on one side edge of the locating area 202 and one end of the first guider track 2041 is connected with the second guider track 2042 The first guider track 2041 and the second guider track 2042 are perpendicular with each other, so that the first guider track 2041 can be moved along the second guider track 2042. The end where the first guider track 2041 is connected with the second guider track 2042 has a hole which has a size and a shape matched with the size and shape of a side of the second guider track 2402, so that the second guider track 2042 can pass through the hole and the first guider track 2041 can be moved along the second guider track 2042.

The displacement sensor 201 further comprises a X axis displacement sensor 2011 and a Y axis displacement sensor 2012, wherein the X axis displacement sensor 2011 and the Y axis displacement sensor 2012 are respectively linked to the management module 30, wherein the Y axis displacement sensor 2012 is provided at the end where the first guider track 2041 is connected with the second guider track 2042 for detecting the displacement of the first guider track 2041 which moves along the second guider track 2042, and then the detected result is sent to the management module 30. The X axis displacement sensor 2011 is mounted on the first guider track 2041 and arranged to be moved along the first guider track 2401 for detecting the displacement of the X axis displacement sensor 2011 on the first guider track 2041, and then the detected result is sent to the management module 30. The range of the locating area 202 means the freely movable range of the X axis displacement sensor 2011 on the sliding frame. Preferably, the X axis displacement sensor 2011 and the Y axis displacement sensor are photoelectric sensors. Preferably, the photoelectric sensor is a grating sensor.

Referring to FIG. 10 of the drawing, another alternative mode of the preferred embodiment of the present invention is illustrated, wherein in order to enable the game player to rapidly and accurately find the displacement sensor 201 even while the game player has no need to leave his or her sight from the display device when the game player is playing a game, the locating device 20 further comprises a return device 203, so that the displacement sensor 201 can be returned to its original position when the game player releases the finger pressed on the displacement sensor 201. The original position of the displacement sensor 201 is a middle position of the first guider track 2041, and, at the same time, the first guider track 2041 is provided on a middle of two second guider tracks 2042.

The return device 203 further comprises a plurality of resilient elements 2031 respectively provided at both ends of the first guider track 2041 and both ends of two second guider tracks 2042, wherein resilient element one end of the resilient element is connected with one end of the second guider track 2042 and the other end of the resilient element 2031 is connected with one end of the first guider track 2041, so that the first guider track 2041 can return to the middle position of the two second guider tracks 2042. Also, a plurality of resilient elements 2031 is respectively provided between the displacement sensor 201 and the first guider track 2041 resilient element respectively, wherein one end of the resilient element 2031 is connected with one end of the first guider track 2041 while the other end of the resilient element 2031 is connected with the displacement sensor 201, so that the displacement sensor 201 can return to the middle position of the first guider track 2041.

When the displacement sensor 201 is located in an initial position, the forces applied by the resilient elements 2031 against the displacement sensor 201 is in a balance condition, and, at the same time, the forces applied by the resilient elements 2031 against the first guider track 2401 is in a balance condition. resilient element resilient element When the displacement sensor 201 moves away from the initial position, the balance condition of the forces is broken, a retracted force is thus generated rendering the displacement sensor 201 returning to the initial position. Preferably, the resilient element 2031 can be a spring, tension spring or rubber band.

In order to enable the weapon cursor used by the game character does not move with the displacement sensor 201 on the display device during the returning of the displacement sensor 201 to the initial position (in other words, the displacement sensor 201 isn't in working condition during returning to the initial position), a switch 2014 is provided on the displacement sensor 201, wherein the switch 2014 is connected with the displacement sensor 201 for controlling the working condition of the displacement sensor 201. The switch 2014 can be a touch sensor that, when the finger of the game player touches the switch 2014, the displacement sensor 201 is in the working condition and the displacement sensor 201 controls the weapon cursor of the game character being used. When the finger of the game player removes from the switch 2014, the displacement sensor 201 stops working, and, at this time, the displacement sensor 201 stops controlling the weapon cursor used by the game character, so that the weapon cursor doesn't move with the displacement sensor 201.

The switch 2014 can be a retracting element 2015, having a resilient ability, provided on the displacement sensor 201 so as to retain the displacement sensor 201 an effective distance of the detection displacement thereof. When the game player slightly presses down the displacement sensor 201 to render the displacement sensor 201 to return to the effective distance of the detection displacement, the displacement sensor 201 is in the working condition. When the finger of the game player moves away from the displacement sensor 201, the displacement sensor 201 moves away the effective distance of the detection displacement due to the resilient element, so that the displacement of the displacement sensor 201 becomes not detectable and thus the weapon cursor used by the game character will not move with the displacement sensor 201.

Figure 14:
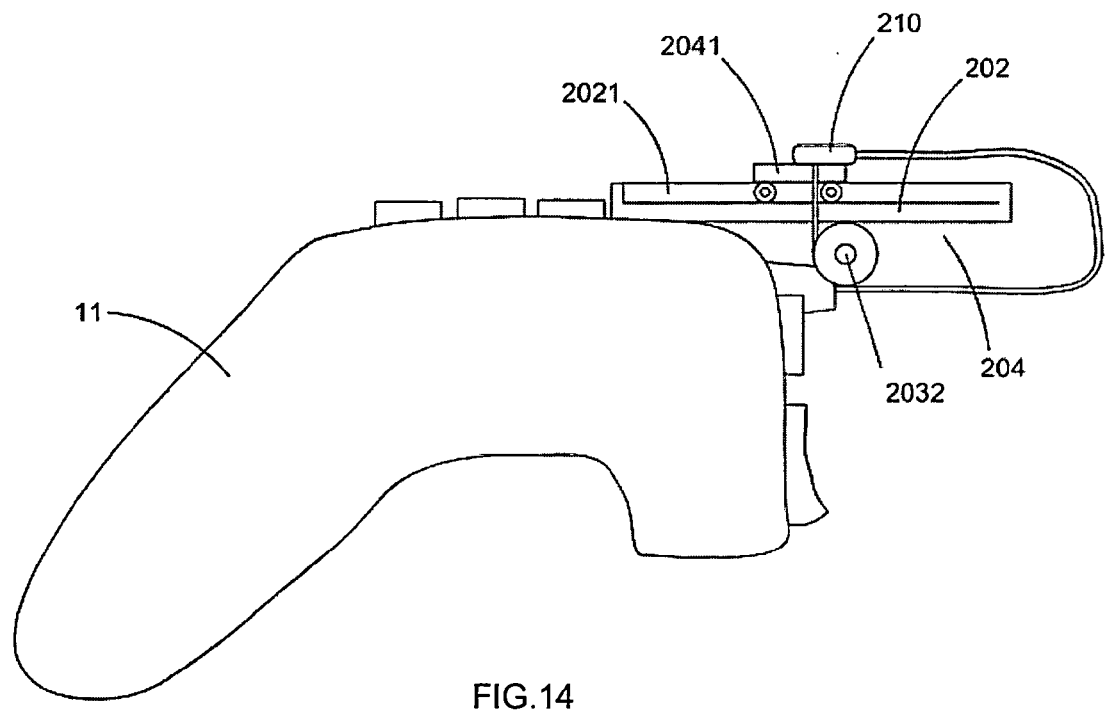
FIG. 14 is side view of a game controller according to an alternative mode of the above preferred embodiment of the present invention, illustrating another alternative reversion device structure.

Referring to FIG. 14 of the drawings, the return device 203 further comprises a retracting wire axle 2032, which is mounted on the bottom surface of the locating area 202, and a central hole 2022 is provided in the middle of the locating area 202. The retracting wire axle 2032 of the return device 203 has a wire winding there around, wherein one end of the wire penetrates through the central hole 2022 to connect with wire the displacement sensor 201. When the displacement sensor 201 moves, the wire is pulled out from the retracting wire axle 2032. When the game player releases his or her finger, the retracting wire axle 2032 starts to retract the wire and pulls the displacement sensor 201 back to the initial position, i.e. the centre of the location area 202.

The return device 203 further comprises an affixing end 2033 located in the centre of the locating area 202, a resilient element 2031 having one end connected with the affixing end 2033 and the other end connected with the displacement sensor 201, wherein when the displacement sensor 201 is in the initial position, that is in the middle of the locating area 202, the resilient element 2031 is in a balance condition. In other word, at this time, the resilient element 2031 is in natural extension. If the displacement sensor 201 moves away from the initial position, the resilient element 2031 would generate a retracting force to the displacement sensor 201 to drive the displacement sensor 201 to return to the initial position. The game player releases his or her finger, the displacement sensor 201 would return the initial position rapidly and accurately.

Referring to FIG. 18 to FIG. 21 of the drawings, a game controller according to a preferred embodiment of the present invention is illustrated, in which the game controller is for video gaming activity and is electrically connected to a video game platform, and comprises a controller housing 10, a management module 30 received in the controller housing 10, a control panel 14, and a locating device 20. The control panel 14 comprises a direction control button 111 and a plurality of action control buttons 112 spacedly provided on the controller housing 10.

According to the preferred embodiment of the present invention, the controller housing 10 is ergonomically designed to be grabbed by a user's hand, and has a main portion 13, and two side gripping portions, the left handle 11 and the right handle 12, rearwardly extended from two sides of the main portion 13.

The management module 30 is electrically connected to the control panel 14 and the locating device 20, and is electrically connected to a game platform, such as a PLAYSTATION 3, for providing input commands for gaming activities. The electrical connection between the management module 30 can be wired or through wireless technology, such as Bluetooth technology. Thus, the game controller further comprises a connection socket 50 provided on the controller housing 10 for electrically connecting to the game platform via a predetermined cable 51. The management module 30 comprises a predetermined Integrated Circuit for processing input commands which are to be transmitted to the game console.

The locating device 20 comprises a displacement sensor 201 provided on the controller housing 10, and a securing device 2020 mounted on the displacement sensor 201, wherein a user's thumb is arranged to detachably engage to the securing device 2020 for controllably initiating movement commands to the displacement sensor 201. More specifically, the securing device 2020 comprises an elongated supporting member 421 extended from the displacement sensor 201, and a plurality of resilient rings 422 spacedly provided on the elongated supporting member 421, wherein the user's thumb is arranged to pass through the resilient rings 422 to physically communicate with the displacement sensor 201. Thus, each of the resilient rings 422 has a predetermined diameter which is slightly larger than a diameter of the user's thumb so as to allow the user's thumb to easily pass through the resilient rings 422.

Figure 21:
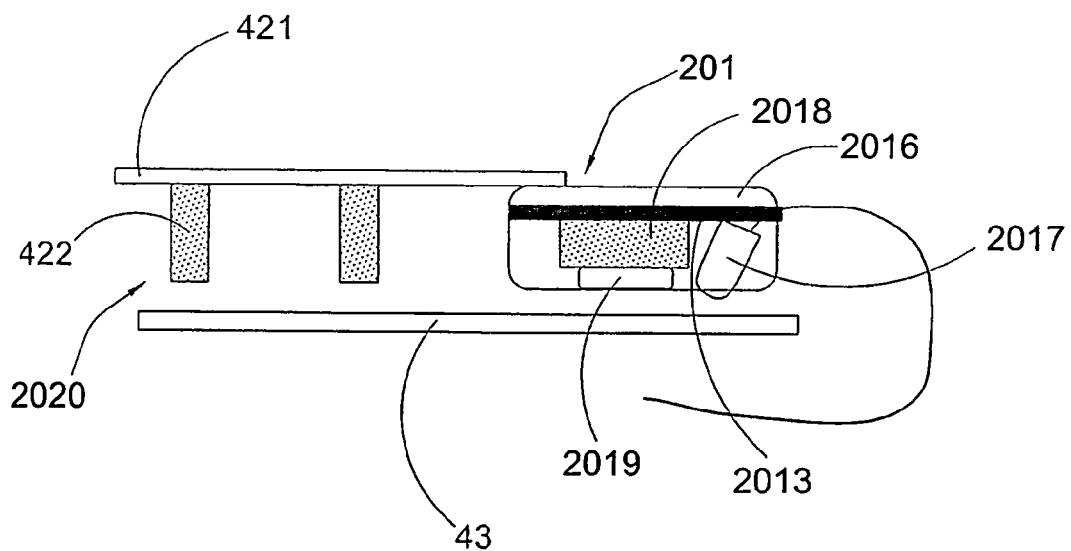
FIG. 21 is a schematic view of the game controller according to the above preferred embodiment of the present invention.

As shown in FIG. 21 of the drawings, the displace sensor 201 is mounted on a front end portion of the elongated supporting member 421 in such a manner that when the user's thumb is put in the resilient rings 422, the user's thumb is allowed to drive the displace sensor 201 to move.

The locating device 20 further comprises a movement detection device 43 provided at a front corner portion of the controller housing 10, wherein the displacement sensor 201 and the securing device 2020 are arranged to move on top of the movement detection 204 for initiating corresponding in-game cursor's movements. Note that the movement detection 204 can be mounted on the controller housing 10 through a variety of means, such as through magnets attached between the movement detection device 43 and the controller housing 10.

As shown in FIG. 21 of the drawings, the displacement sensor 201 comprises an outer casing 2016, a sensor circuitry 2013 received in the outer casing 2016, an optical sensor 2018 mounted on the sensor circuitry 2013, an optical lens 2019 mounted on the optical sensor 2018, and an illuminating device 2017 received in the outer casing 2016 and is positioned adjacent to the optical lens 2019, wherein the illuminating device 2017 is arranged to generate a predetermined amount of illumination toward the movement detection device 43. On the other hand, the displacement arrangement 201 further comprises a connection cable 44 electrically connecting the displacement sensor 201 and the management module 30 through the connection socket 50 provided on the controller housing 10. It is worth mentioning that the displacement sensor 201 is in physical contact with the movement detection device 43 when it is used to control cursor's movement in a gaming screen.

The operation of the present invention is as follows: a user may grab the controller housing 10 with both hands, while placing his or her thumb into the resilient rings of the securing device 2020. When the user is playing first personal shooting games, the user may move his or her thumb on top of the movement detection device 43 for controlling cursor's movement in the game. The movement of the user's thumb will drive the displacement sensor 201 to move as well. The corresponding movement of the displacement sensor 201 is processed by the sensor circuitry 2013 and transmitted to the management module 30. The corresponding signal is then transmitted to the game platform for initialing the cursor movement.

The game controller further comprises a wireless transceiver 60 received in the controller housing 10 and is electrically connected to management module 30 for wirelessly transmitting control signals to the game platform.

Moreover, it is important to mention that the game controller of the present invention can be set to support video gaming console and computer gaming, so that the user is able to select which different modes of operations for playing games on video game consoles or computers. Thus, the connection socket 50 is embodied as a USB socket for connecting to a USB port of a computer, so as to allow the user of the present invention to control cursor movement when playing computer games.

Referring to FIG. 22 to FIG. 25 of the drawings, an alternative mode of the game controller according to the above embodiment of the present invention is illustrated. This alternative mode is similar to the above embodiment as shown in FIGS. 18-21, except that the game controller further comprises a vibration device 70' provided in the controller housing 10, and is electrically connected to the management module 30 in such a manner that when game played by the gaming platform is programmed to generate vibration on the part of the game controller, the vibration device 70' is arranged to generate vibration of a predetermined magnitude and a predetermined duration.

Moreover, the illuminating device 2017' is embodied as a laser emitting device which is arranged to generate laser beam toward the movement detection device 43'. Furthermore, each of the optical lens 2019 and the illuminating device 2017' is positioned in the outer casing 2016 at a predetermined angle of inclination toward each other for allowing effective reflection of laser beam at the movement detection device 43'.

Figure 22:
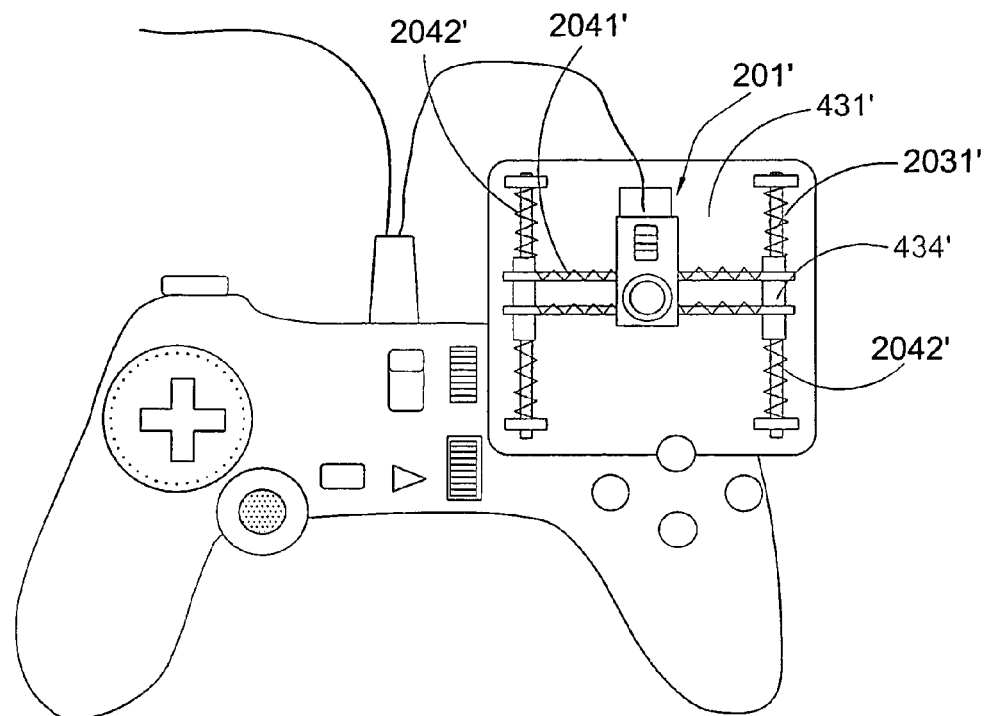
FIG. 22 is a front view illustrating an alternative mode of the game controller according to the above preferred embodiment of the present invention.
Figure 23:
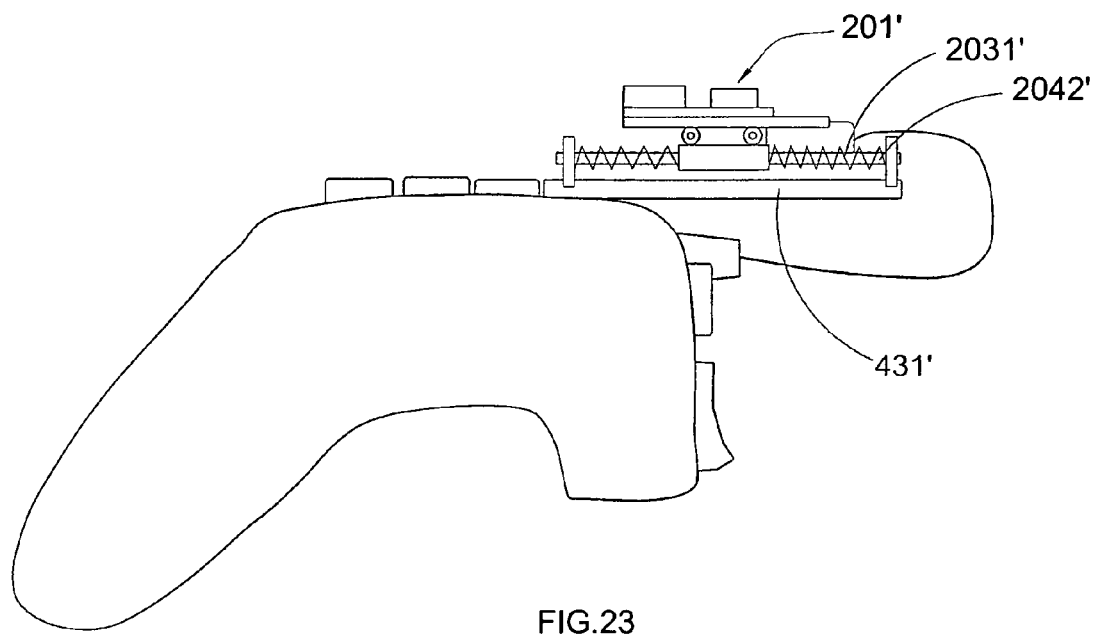
FIG. 23 is a side view of illustrating the above alternative mode of the game controller according to the above preferred embodiment of the present invention.
Figure 24:
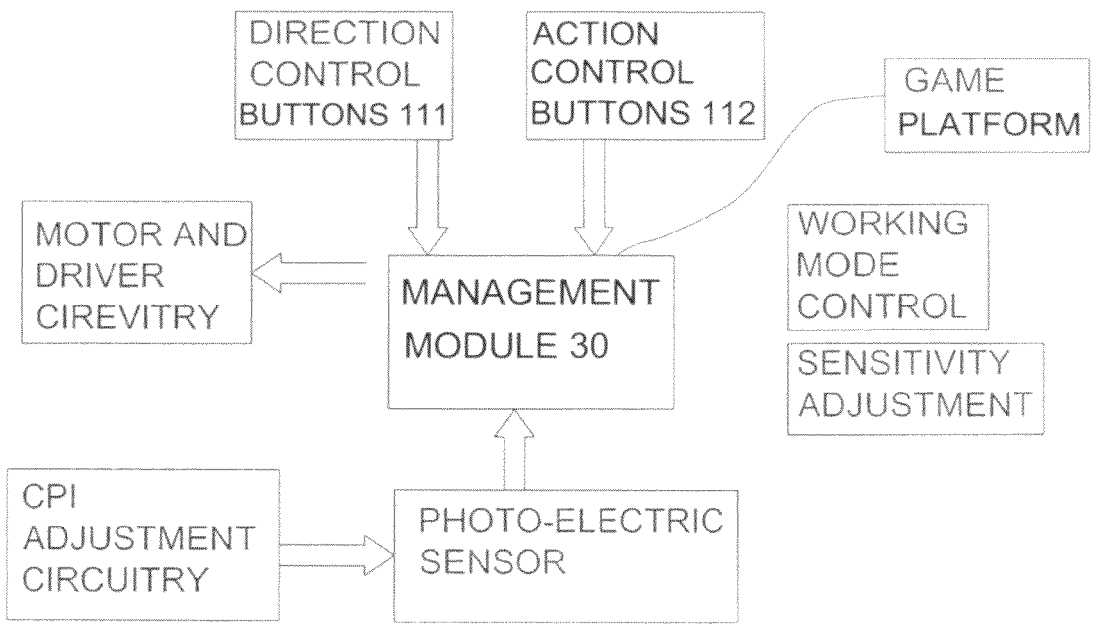
FIG. 24 is a block diagram of the game controller according to the above preferred embodiment of the present invention.
Figure 25:
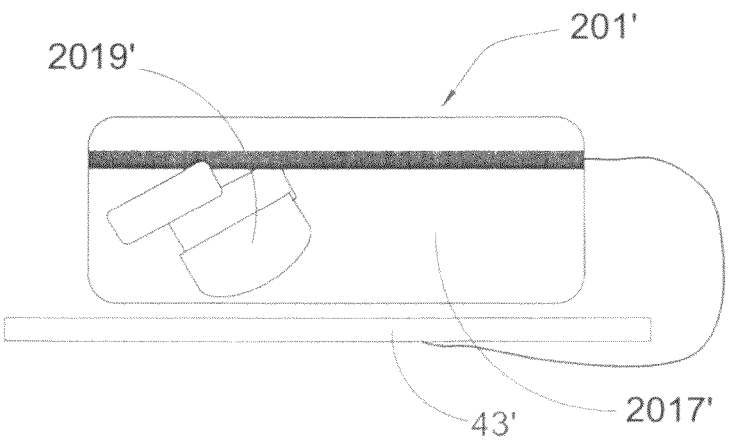
FIG. 25 is schematic diagram of the optical displacement sensor of the first alternative mode of the game controller according to the above preferred embodiment of the present invention.

As shown in FIG. 22 to FIG. 23 of the drawings, the movement detection device 43' comprises a supporting base 431', a first guider track 2041' and two parallel guider track 2042' spacedly mounted on the supporting base 431', and a plurality of resilient elements 2031' mounted on the first guider track 2041' and two the second guider tracks 2042' respectively, wherein the displacement sensor 201 is movably mounted with respective to the first guider track 2041' and two the second guider tracks 2042', in such a manner that the displacement sensor 201 is capable of sliding along the first guider track 2041' and having a transverse displacement with respect to the controller housing 10 (but along a longitudinal direction of two second guider tracks 2042').

More specifically, the two the second guider tracks 2042' are transversely mounted on two side portions of the supporting base 431' of movement detection device 43' while the first guider track 2041' is extended between the two the second guider track 2042' so that the displacement sensor 201 is capable of moving in a plurality of directions for controlling the movement of cursors on a gaming screen.

Furthermore, the movement detection device 43' further comprises a plurality of sliding members 434' slidably mounting the two the second guider track 2042' with two ends of the first guider track 2041' so as to allow a transverse movement (with respect to the controller housing 10 but along a longitudinal direction of the two second guider track 2042') of the first guider track 2041'. In this alternative mode, the displacement sensor 201 is mounted on the first guider track 2041' so that the displacement sensor 201 is capable of moving along the transverse direction of the first guider track 2041', as well as the longitudinal direction of two the second guider track 2042' for controlling cursor's movement in the corresponding direction.

On the other hand, the resilient elements 2031' are arranged to bias against the displacement sensor 201 and the sliding members 434' for driving them to move back to their respective original position when the user has moved it to another position. In this alternative mode, the displacement sensor 201 is mounted at a mid portion of the first guider track 2041' as an original position thereof. As such, the user is able to slide the displacement sensor 201 along the first guider track 2041' for controlling a horizontal movement of the cursor, while the user is also able to slide the displacement sensor 201 along the two the second guider tracks 2042' for controlling a vertical movement of the cursor. After movement of the cursor, the resilient elements 2031' will move the displacement sensor 201 and the sliding members 434' back to their original positions respectively. The displacement sensor 201 further comprises a plurality of switches 2014 formed on the outer casing 2016 for selectively operating the displacement sensor 201 and for adjusting sensor's sensitivity.

When the displacement sensor 201 is in use, the user may put his or her thumb onto the switch 2014 so as to turn on the displacement sensor 201. The user may then move the displacement sensor 201 to a desirable position so as to control the cursor's movement. After the cursor's movement has completed, the user may relieve the pressing force exerted to the switch 2014 and turn off the displacement sensor 201. Furthermore, the displacement sensor 201 will then be driven back to its original position by the resilient element 2031'. Moreover, the switch 2014 may be made of material having high coefficient of friction for enabling the user to easily move the displacement sensor 201.

Figure 26:
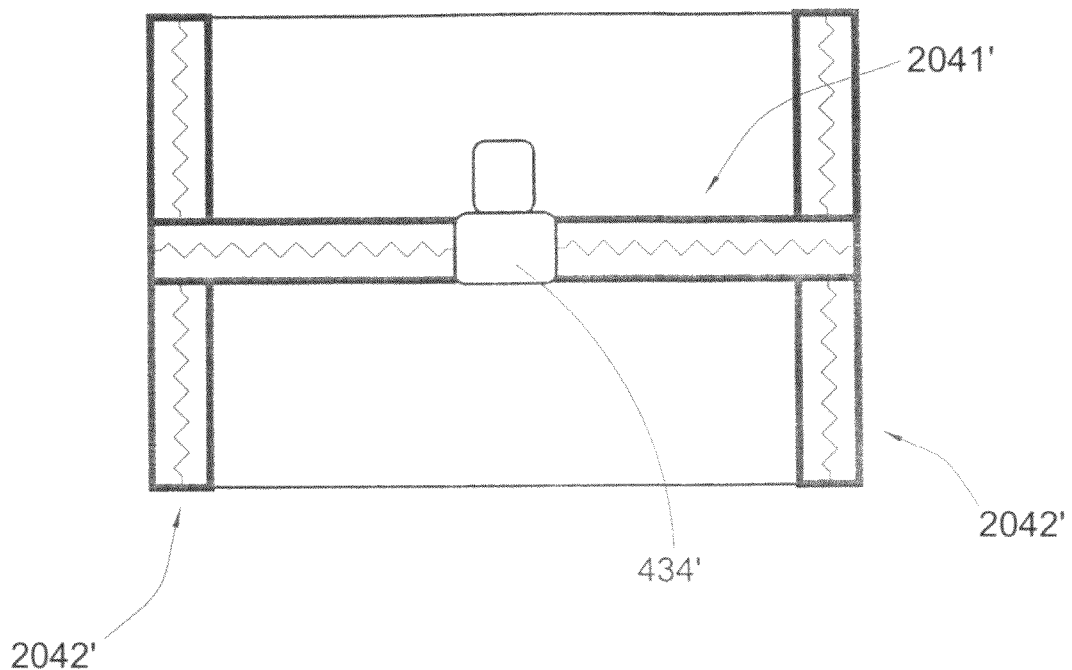
FIG. 26 is a schematic view illustrating the cursor displacement arrangement of the game controller according to the above preferred embodiment of the present invention.
Figure 27:
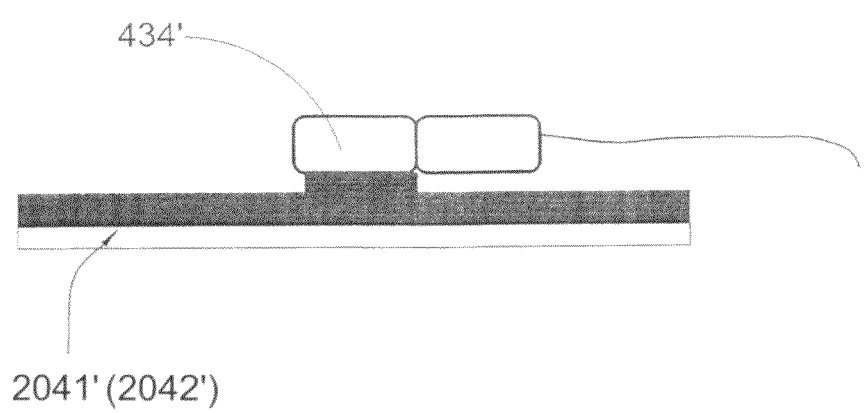
FIG. 27 is a schematic view illustrating an alternative mode of the cursor displacement arrangement of the game controller according to the above preferred embodiment of the present invention.

As a slight alternative, the first guider track 2041' and two the guider track 2042' can be configured in a manner as shown in FIG. 26 to FIG. 27 of the drawings. Each of the first guider track 2041' and the two second tracks 2042' has an elongated slot 4324' formed therein, wherein the sliding members 434' are mounted in the elongated slots 4324' of the two guider tracks 2041' respectively. Thus, the first guider track 2041' is allowed to slidably move with respect to two the second guider tracks 2042'.

Figure 28:
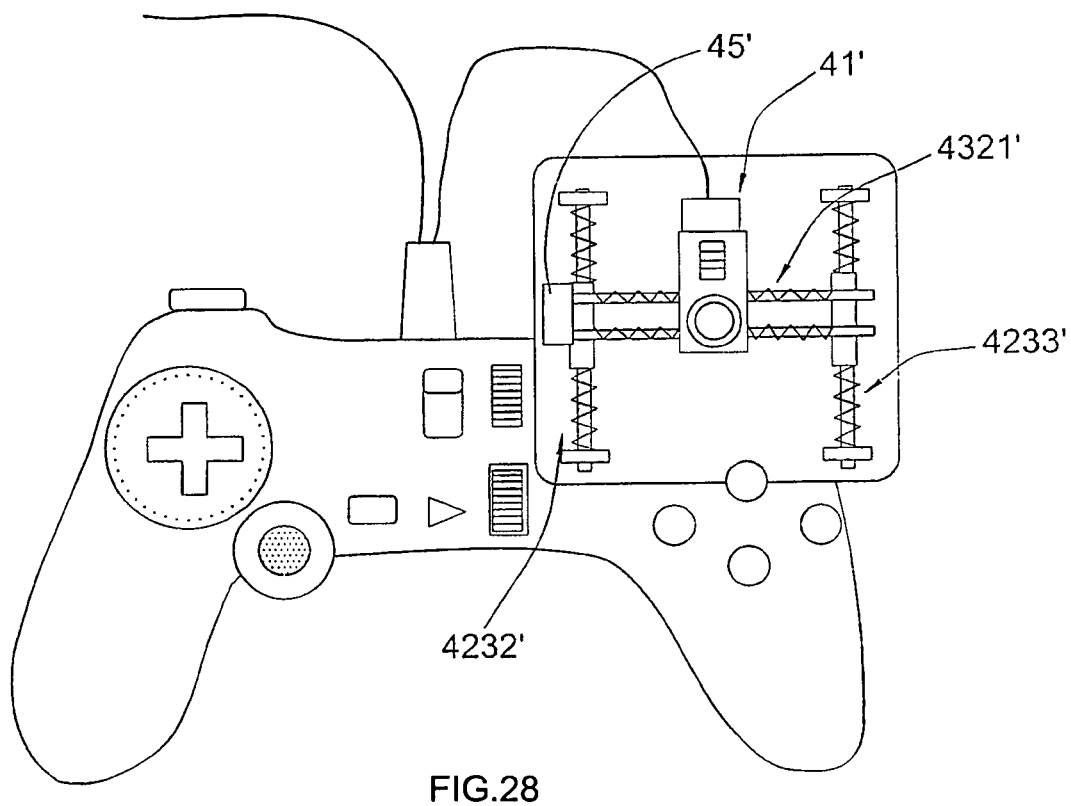
FIG. 28 is front view illustrating an alternative mode of the game controller according to the above preferred embodiment of the present invention.
Figure 29:
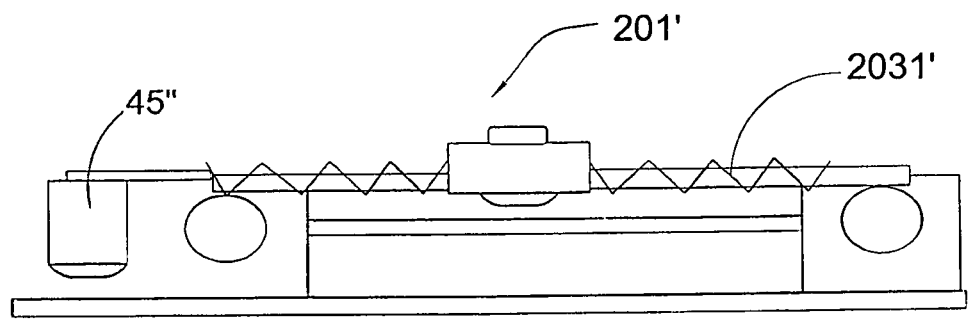
FIG. 29 is schematic view of an optical displacement sensor of the game controller according to the above preferred embodiment of the present invention.
Figure 30:
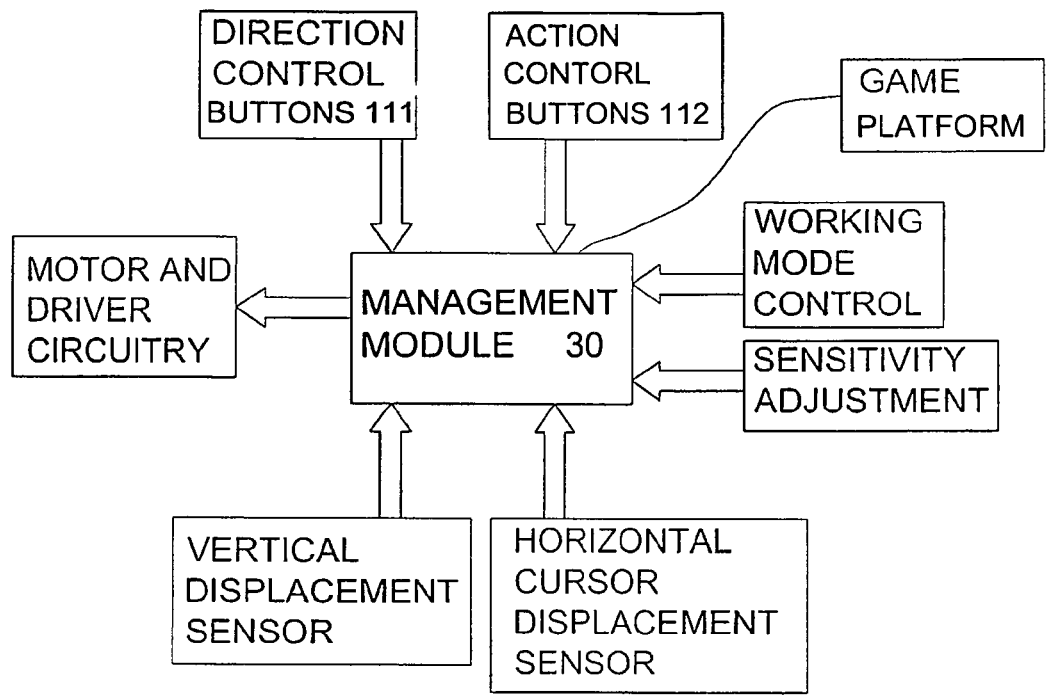
FIG. 30 is a block diagram of an alternative mode of the game controller according to the above preferred embodiment of the present invention.

Referring to FIG. 28 to FIG. 30 of the drawings, another alternative mode of the game controller according to the above embodiment of the present invention is illustrated. The alternative mode is similar to the above alternative mode as shown in FIGS. 22 to 25, except that the locating device 20 further comprises an addition displacement sensor 45' provided at one end of the first guider track 2041' for controlling a transverse movement of the cursor by detecting a transverse movement of the first guider track 2041'. The displacement sensor 201 is still provided at a mid portion of the first guider track 2041' for controlling a longitudinal movement of the cursor in a manner as mentioned above.

Referring to FIG. 31 to FIG. 34 of the drawings, another alternative mode of the game controller according to the above embodiment of the present invention is illustrated. The alternative mode is similar to the above alternative mode as shown in FIGS. 22 to 25, except that the displacement sensor 201A. According to this alternative mode, the displacement sensor 201A is embodied as a diffractive sensor which is arranged to determine sensor's movement by diffraction. More specifically, the displacement sensor 201A comprises an outer casing 2016A having a diffraction slot 4111A, a sensor circuitry 2013A received in the outer casing 2016, an optical sensor 2018A electrically connected with the sensor circuitry 2013A, an optical lens 2019A provided in the outer casing 2016A at a position opposite to the sensor circuitry, an illuminating device 2017A provided in the outer casing 2016A and is arranged to generate illumination toward the optical lens 2019A, and a diffraction slit member 416A supported in the diffraction slot 4111A, wherein the light generated by the illuminating device 2017A is arranged to pass through the optical lens 2019A from one side of the diffraction slot 4111A and diffracted by the diffraction slit member 416A and reach the optical sensor 2018A positioned opposite to the optical lens 2019A (i.e. the other side of the diffraction slot 4111A).

In this alternative mode, the locating device 20A further comprises an addition displacement sensor 45A provided at one end of the first guider track 2041' for controlling a transverse movement of the cursor by detecting a transverse movement of the first guider track 2041'. The displacement sensor 201A is still provided at a mid portion of the first guider track 2041' for controlling a longitudinal movement of the cursor in a manner as mentioned above. Note that both the displacement sensor 201A and the addition displacement sensor 45A are diffractive sensors having the structure as mentioned above.

Figure 31:
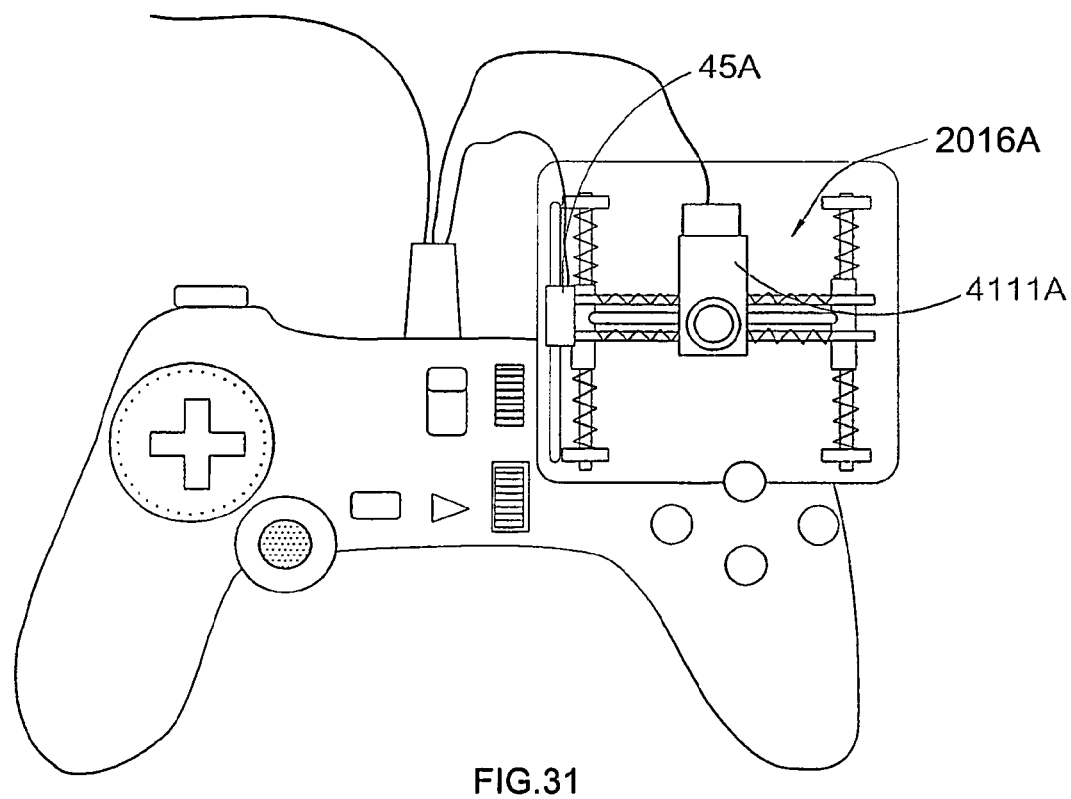
FIG. 31 is front view illustrating an alternative mode of the game controller according to the above preferred embodiment of the present invention.
Figure 32:
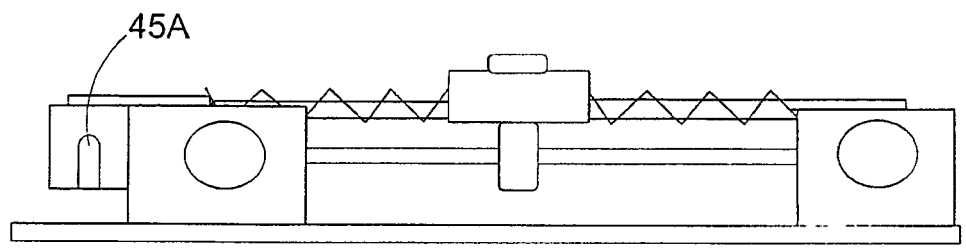
FIG. 32 is a schematic view of the optical displacement sensor of the above alternative mode of the game controller according to the above preferred embodiment of the present invention.
Figure 33:
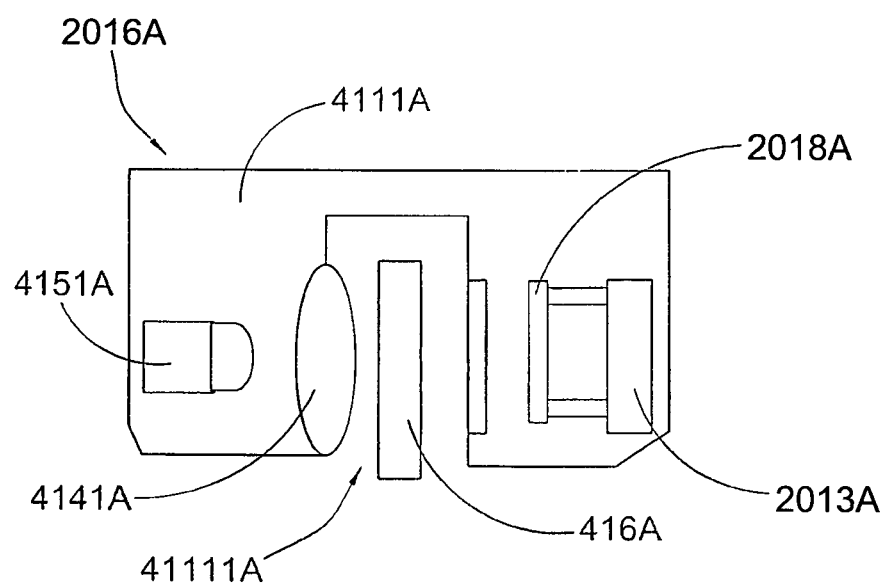
FIG. 33 is a schematic view of an alternative mode of the optical displacement sensor of the game controller according to the above preferred embodiment of the present invention.
Figure 34:
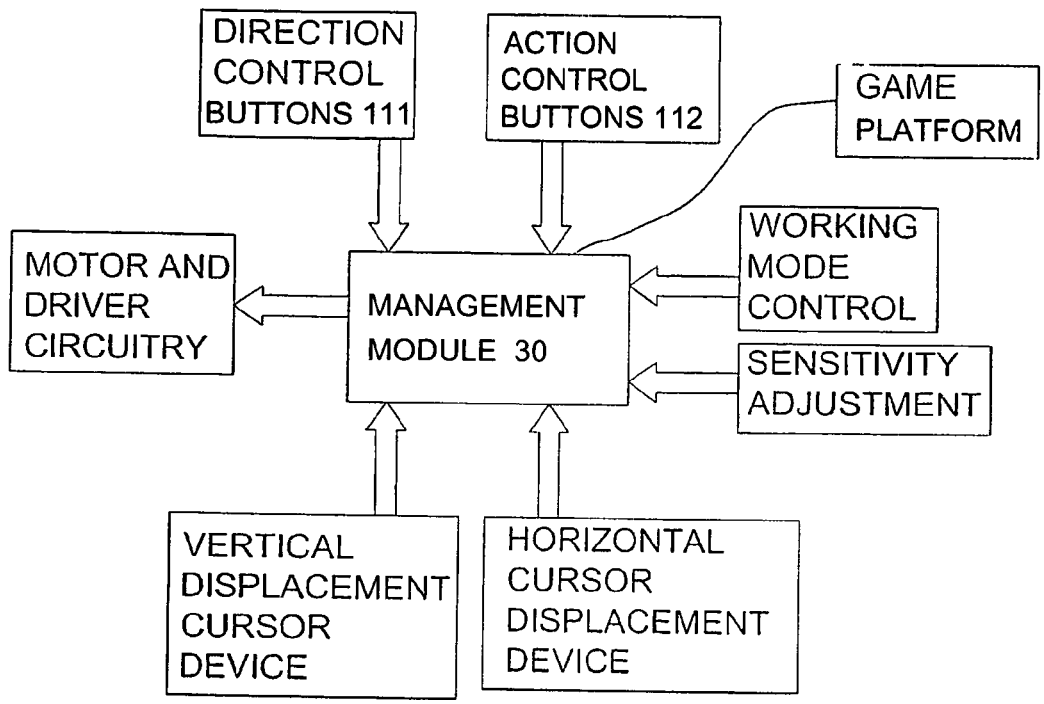
FIG. 34 is a block diagram of an alternative mode of the game controller according to the above preferred embodiment of the present invention.

As shown in FIG. 31 of the drawings, it is worth mentioning that the diffraction slit member 416A of each of the displacement sensor 201A and the addition displacement sensor 45A is supported along the first guider track 2041' and the second guider track 2042' respectively for accomplishing diffraction of light beams generated by the corresponding illuminating device 415A.

Figure 35:
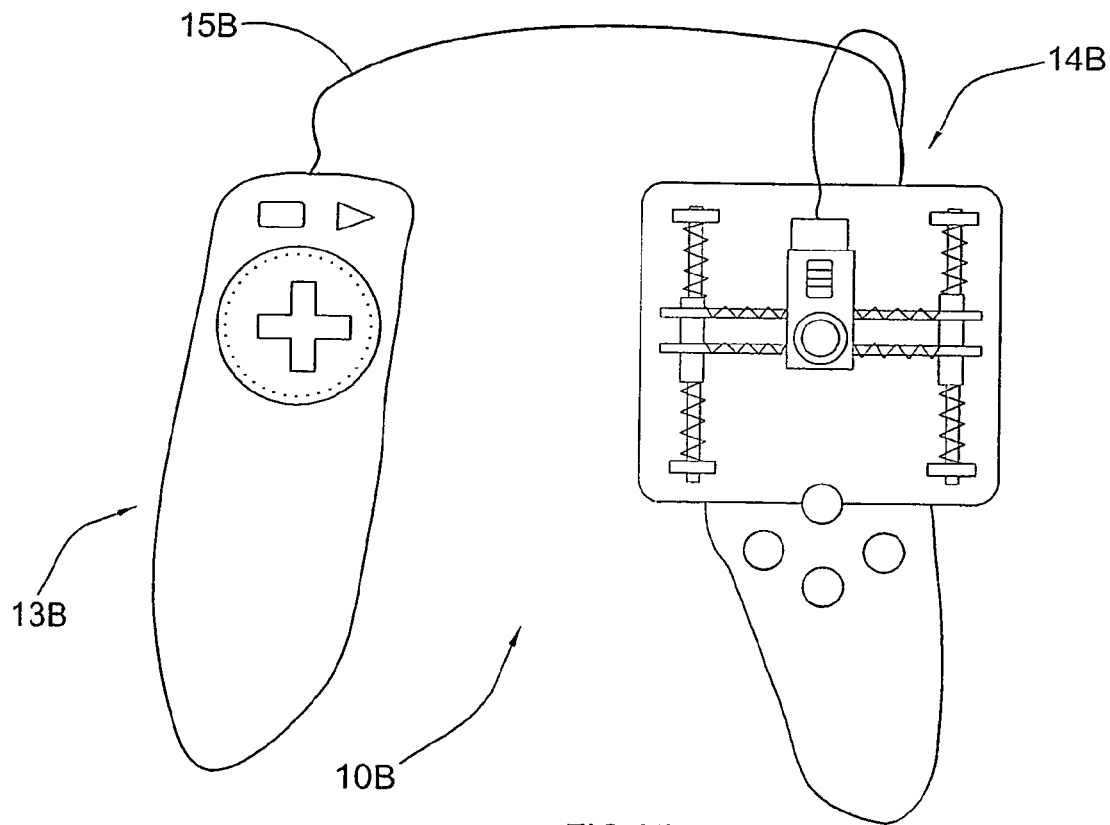
FIG. 35 is a front view illustrating an alternative mode of the game controller according to the above preferred embodiment of the present invention.

Referring to FIG. 35 of the drawings, another alternative mode of the game controller according to the above embodiment of the present invention is illustrated. This alternative mode is similar to the above alternative mode as shown in FIGS. 22 to 25, except that the controller housing 10B. In this alternative mode, the controller housing 10B comprises a first housing body 13B and a second housing body 14B, wherein the first and the second housing body 13B, 14B are electrically connected through a wire 15B.

In this alternative mode, the management module 30 and the action control buttons 112 are received in the second housing body 14B while the direction control device 111 of the control panel 30 is provided on the first housing body 13B. The locating device 20 is provided on the second housing body 14B so that the user may use one of his or her hands for controlling cursor movement and operate the action control buttons 112, wherein his or her remaining hand is used for controlling the direction control device 111. The direction control signals are then transmitted to the management module 30 through the wire 15B or in a wireless manner.

Figure 36:
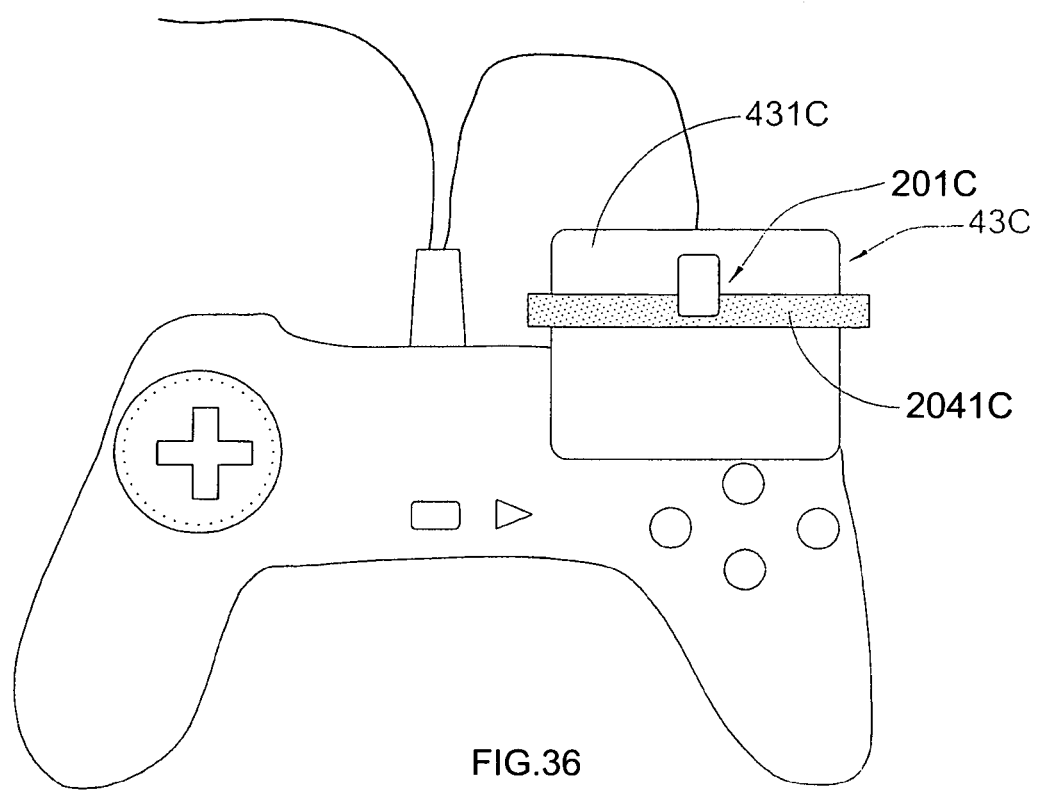
FIG. 36 is a front view illustrating an alternative mode of the game controller according to the above preferred embodiment of the present invention.
Figure 37:
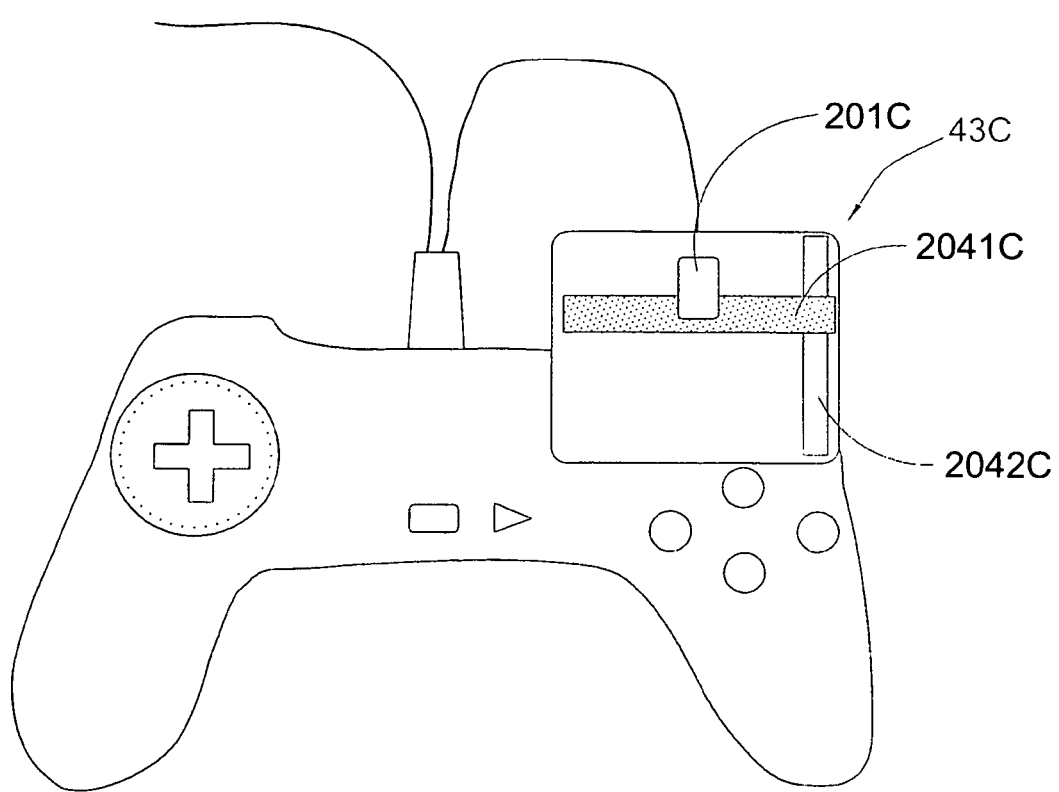
FIG. 37 is a front view illustrating an alternative mode of the game controller according to the above preferred embodiment of the present invention.

Referring to FIG. 36 to FIG. 37 of the drawings, another alternative mode of the game controller according to the above embodiment of the present invention is illustrated. This alternative mode is similar to the above alternative mode as shown in FIGS. 22 to 25, except that the movement detection device 43C. In this alternative mode, the movement detection device 43C comprises supporting base 431C and first and second guider track 2041C, 2042C, mounted on the supporting base 431C, wherein the displacement sensors 201C, 45C are mounted on the first and the second guider tracks 2041C, 2042C respectively. In FIG. 36 of the drawings, there is only one guider track, i.e. the first guider track 2041C mounted on the supporting base 431C.

Figure 38:
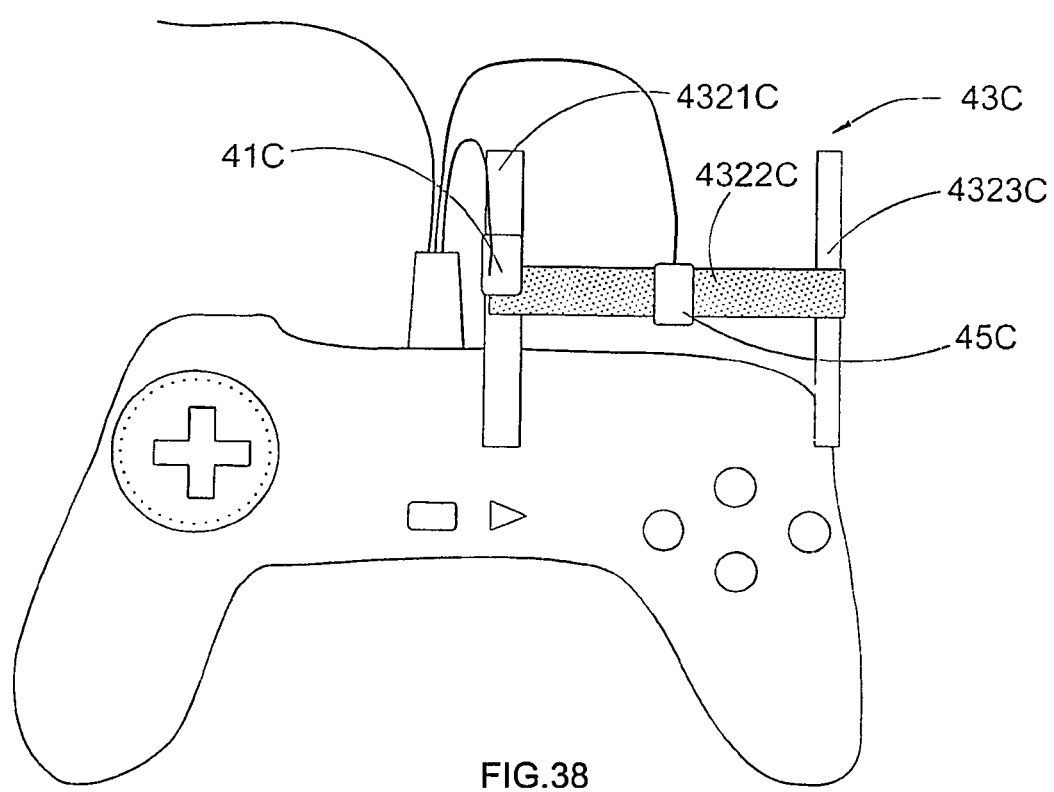
FIG. 38 is front view illustrating an alternative mode of the game controller according to the above preferred embodiment of the present invention.
Figure 39:
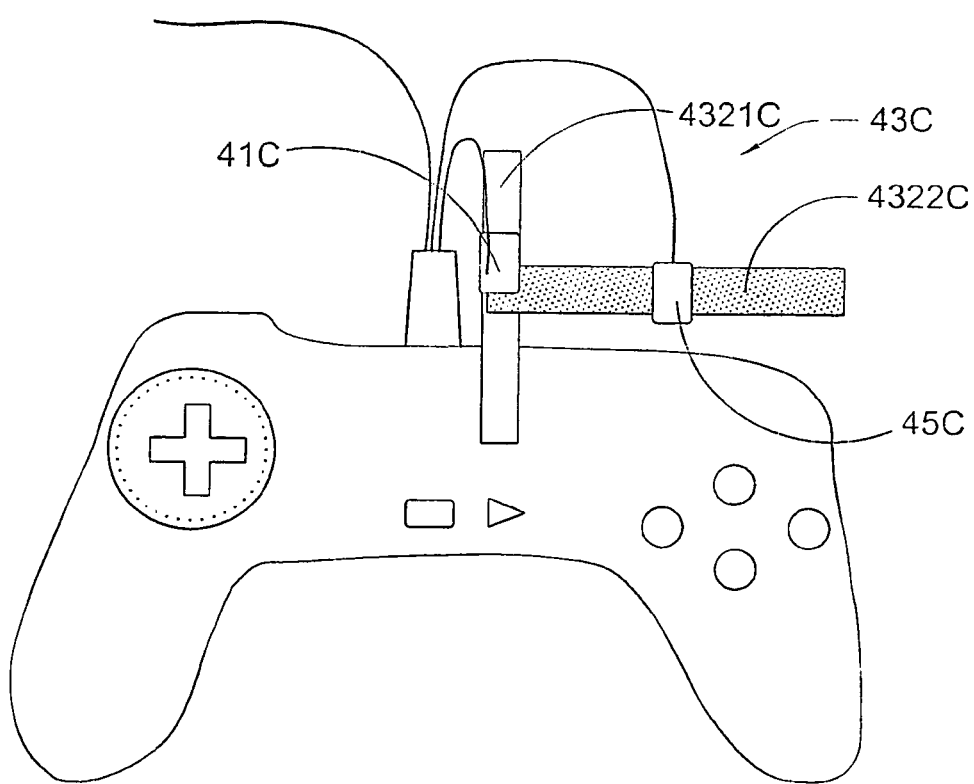
FIG. 39 is a front view illustrating an alternative mode of the game controller according to the above preferred embodiment of the present invention.

Referring to FIG. 38 to FIG. 39 of the drawings, another alternative mode of the game controller according to the above embodiment of the present invention is illustrated. This alternative mode is similar to the above alternative mode as shown in FIGS. 22 to 25, except that the movement detection device 43C. In this alternative mode, the movement detection device 43C comprises first supporting a base 2141C and two second supporting base 2142C mounted underneath the first guider track 2041C and the two second guider tracks 2042C respectively, wherein the displacement sensors 2011C, 2012C are mounted on the first and the second guider tracks 2041C, 2042C respectively.

It is important to mention that the movement detection device. In the event that there are only first and the second guider track 2041C, 2042C, the movement detection device 43C comprises merely first and the second supporting base 2141C, 2142C for mounting underneath the first and the second guider track 2041C, 2042C respectively.

Figure 16:
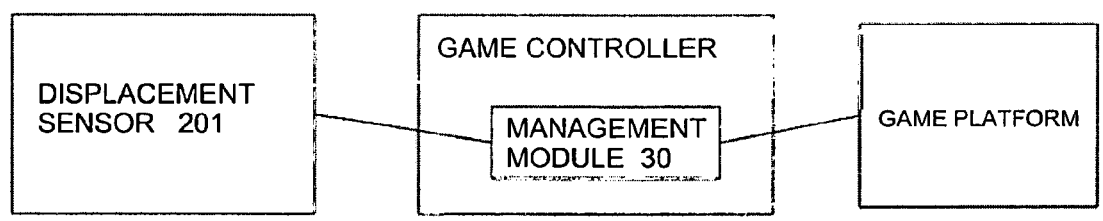
FIG. 16 is block diagram of the game controller according to the above preferred embodiment of the present invention, illustrating the displacement sensor linked to the game platform through the game controller.
Figure 17:
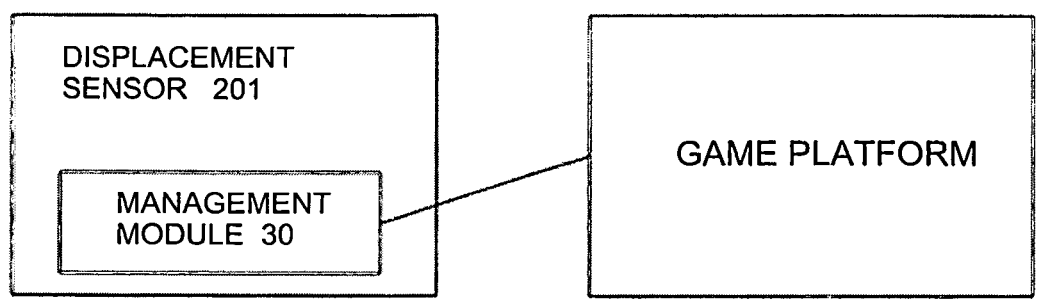
FIG. 17 is block diagram of the game controller according to the above preferred embodiment of the present invention, illustrating the displacement sensor linked to the game platform through a management module that is setting in the displacement sensor.
Figure 18:
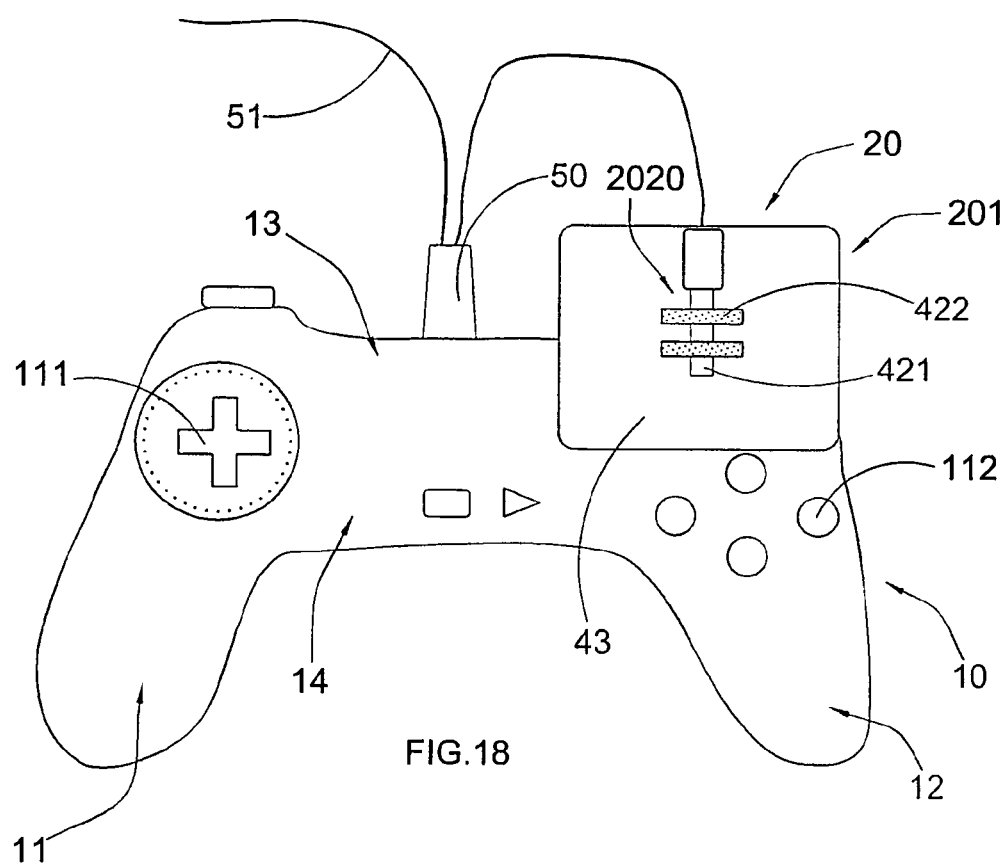
FIG. 18 is a front view of a game controller according to another alternative mode of the above preferred embodiment of the present invention.
Figure 19:
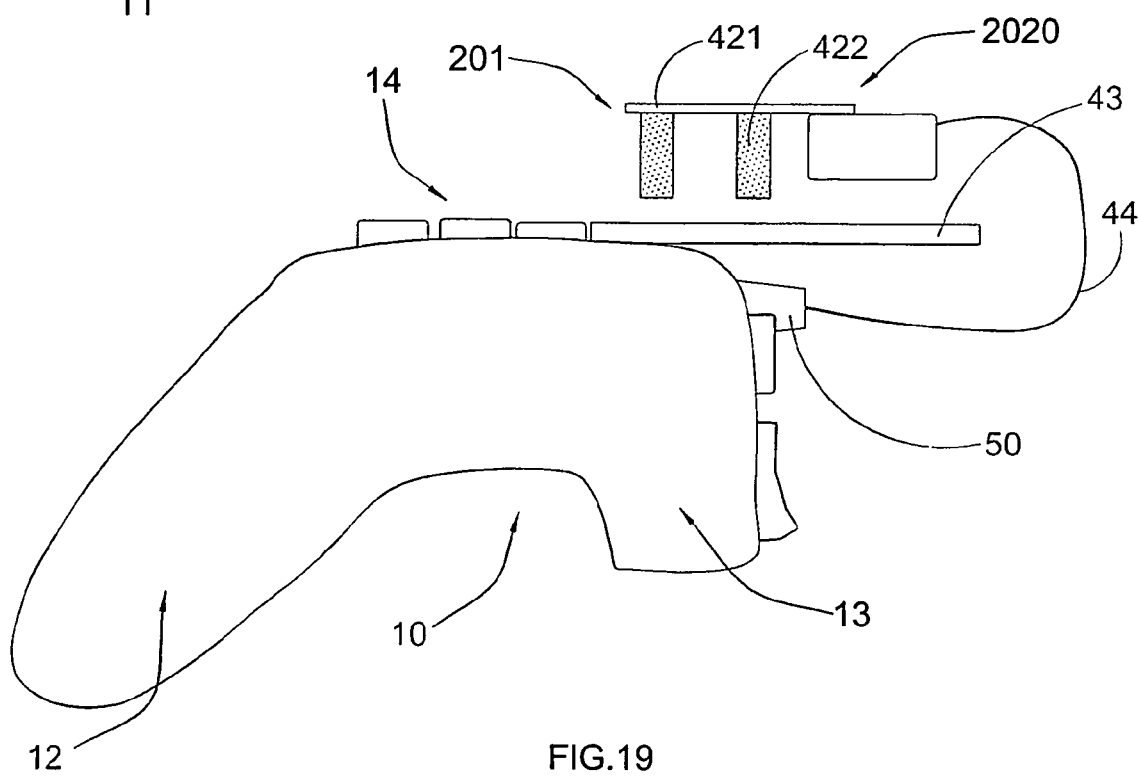
FIG. 19 is a side view of the game controller according to the above alternative mode of the above preferred embodiment of the present invention.
Figure 20:
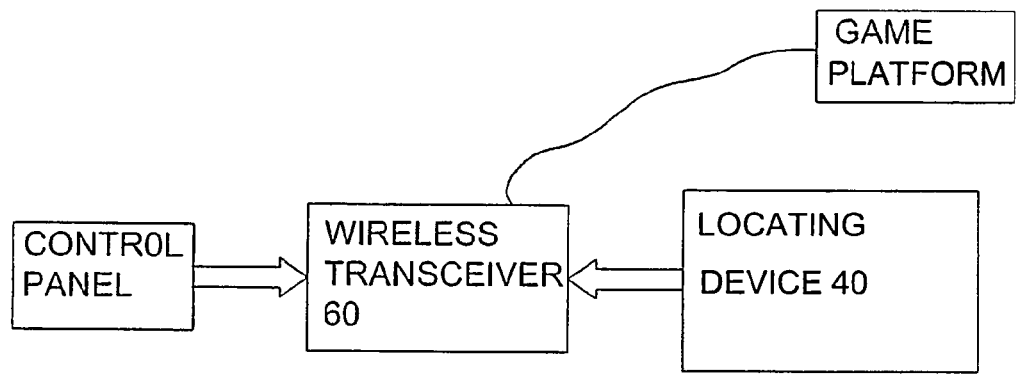
FIG. 20 is a block diagram of the game controller according to the above preferred embodiment of the present invention.

The displacement sensor 201 of the locating device 20 has two connecting method, the first method is above recited that the displacement sensor 201 links to the game platform through the management module 30 of the game controller, the second method is that added a management module 30 on the displacement sensor 201, the management module 30 of the displacement sensor 201 separately links to the displacement sensor 201 and the game platform, so the displacement sensor 201 links to the game platform directly without through the management module 30 of the game controller. As shown on FIGS. 16 and 17. Compare with two connecting method, the second method just added a management module 30 which links to the displacement sensor 201 so that the displacement sensor 201 can link to the game platform directly and didn't need to link to the game controller, the other technical characteristic of the second method as the same as the first method that included the processing data method of the management module 30 which the management module 30 links to the displacement sensor 201 and the data is sent by the displacement sensor 30.

According to the game supported the different game controller, the game is divided into two types, one just supported keyboard and mouse, the other supported the gamepad. But the game controller of the present invention is supported by the game of above type. It worth mentioning that in order to support above two type of game, the game controller employs three work mode A, B and C, wherein mode A is mouse mode, which also is the default mode of the game controller of the present invention, mode B is analogue joystick mode, mode C is analogue mouse mode. Pressing a function key of the game controller to change above three work mode. If the game only supported keyboard and mouse, the game controller of the present invention works on mode A, if the game only supported gamepad, the game controller of the present invention works on mode B or mode C.

The following utilizes a FPS game as example to illustrate the work process of the game controller of the present invention under above three work mode. In the FPS game, the weapon cursor of the game character used is controlled by the displacement sensor 201. The displacement sensor 201, preferable is a photoelectric sensor.

When the game controller of the present invention works on mode A, the data format which the FPS game can identify as the same as the default encapsulation format of the management module 30 of the game controller of the present invention, so it isn't necessary to process the data, the data can send to the game platform directly. The detail work process as recited above.

When the FPS game only supported gamepad, the game controller of the present invention works on mode B or mode C, at this time, the data need to change format which is sent to the game platform by the management module 30, so that the displacement sensor 201 of the locating device 20 of the game controller of the present invention should control the weapon cursor of the game character used of the FPS game. In fact, the processing module 302 of the management module 30 changes the data format which is sent to the game platform.

The detail process of the data change by the processing module 302 of the management module 30 describes as the following.

The specific definition of the joystick signal of the ordinary gamepad is that: the coordinate axis x and coordinate axis y represent the location of the stick, according to the location of the joystick, the coordinate axis x and coordinate axis y of the stick through analog to digital converted, the digital signal between 0 and 255 is sent to the game platform. According the digital signal to determine the moving direction and speed of the cursor. When the axis x send the data to the game platform between 129 and 255, the cursor of the game moves toward right, the data more bigger the moving more faster, at the 255 the moving speed achieves top speed.

When the game controller of the present invention work on the mode B or mode C, the displacement data of the displacement sensor 201 is changed into the displacement value by the processing module 302 of the management module 30, the displacement value is integer that between 0 and 255. The specific process is that:

The processing module 302 of the management module 30 counts the displacement data of the displacement sensor 201, generated the actual moving value. The processing rule is every eight moving unit records 1, the maximum does not exceed 255.

After that, according to the setting sensitivity of the displacement sensor 201, processing the actual moving value of the displacement sensor 201, generated the displacement value of the displacement sensor 201. The rules of processing the procedure is that: the displacement value of the displacement sensor 201=the actual moving value of the displacement value of the displacement sensor 201×the setting sensitivity of the displacement value. The maximum displacement value does not exceed 255. The setting sensitivity is between 1 and 8.

When the work mode of the game controller is mode B, the displacement sensor 201 simulates the control method of the right stick which controls the weapon cursor of the game character using. When the displacement sensor 201 locates in the centre of the locating area 202, the weapon cursor of the game character using does not move, when the displacement sensor 201 moving, the weapon cursor start to move. In the FPS game, the more the displacement sensor 201 is far away from the centre of the locating area 202, the more the weapon cursor moves faster.

In work mode B, the steps that the displacement sensor 201 simulates the right stick by the management module 30 as following:

Step one, the management module 30 detects whether the displacement sensor 201 is in work state, if the displacement sensor 201 isn't in work state, then the communication module 303 of the management module 30 would simulate the coordinate of the current position of the displacement sensor 201, the axis x value of the right stick=128, the axis y value of the right stick=128, then sent the coordinate value to the game platform; if the displacement sensor 201 is working, the go to next step.

Step two, if the displacement sensor 201 moves towards the positive direction of axis X, then the axis X value of the present position of the displacement sensor 201 would be simulated the axis X value of the right stick, the axis X value of the right stick=the axis X value of the right stick+axis X moving value of the sensor, if the axis X value of the right stick more than 255, then the axis X value of the right stick=255, and go to next step; if the displacement sensor 201 moves towards the negative direction of axis X, then the axis X value of the right stick=the axis X value of the right stick− the axis X moving value of the sensor, if the difference value less than 0, then the axis X value of the right stick=0, and go to next step.

Step three, if the displacement sensor 201 moves towards the axis Y positive direction, then the axis Y value of the displacement sensor 201 present position would be simulated the axis Y value of the right stick by the communication, the axis Y value of the right stick=the axis Y value of the right stick+the axis Y moving value of the sensor, if the summation more than 255, then the axis Y value of the right stick=255, and go to next step; if the displacement sensor 201 moves towards the axis Y negative direction, then the axis Y value of the displacement sensor 201 would be simulated the axis Y value of the right stick by the communication module 303, the axis Y value of the right stick=the axis Y value of the right stick−the moving value of the sensor, if the difference value less than 0, then the axis Y value of the right stick=0, and go to next step.

Step four, the axis X value of the right stick and the axis Y value of the right stick are sent to the game platform, which generated by the displacement sensor is simulated the right stick, then this process is done.

When the game controller of the present invention's work mode is mode C, the communication module 303 of the management module 30 changes the displacement data of the displacement sensor 201 into the data format of the right stick, as the following step:

Step one, the displacement sensor 201 sends the displacement data to the processing module 302 of the management module 30, the processing module 302 judges whether the displacement sensor 201 is moving, if the displacement isn't moving, then the processing module 302 simulates the present position of the displacement sensor 201 to the coordinate value of the right stick that the axis X value of the right stick=128, the axis Y value of the right stick=128, if the displacement is moving, the go to next step.

Step two, when the displacement sensor 201 moves toward axis X positive direction, the processing module 302 is simulating the coordinate of the displacement sensor 201, the axis X value of the right stick=128+the axis X displacement value of the displacement sensor, if the axis X value of the right stick more than 255, then the axis X value of the right stick is 255, and go to next step; if the displacement sensor 201 moves towards axis X negative direction, the processing module 302 is simulating the coordinate of the displacement sensor 201, the axis X value of the right stick=128−the axis x displacement value of the displacement sensor, if the axis X value of the right stick less than 0, then the axis X value of the right stick=0, and go to next step.

Step three, when the displacement sensor 201 moves toward axis Y positive direction, the processing module 302 is simulating the coordinate of the displacement sensor 201, the axis Y value of the right stick=128+the axis Y displacement value of the displacement sensor, if the axis Y value of the right stick more than 255, then the axis Y value of the right stick is 255, and go to next step; if the displacement sensor 201 moves towards axis Y negative direction, the processing module 302 is simulating the coordinate of the displacement sensor 201, the axis Y value of the right stick=128−the axis x displacement value of the displacement sensor, if the axis Y value of the right stick less than 0, then the axis Y value of the right stick=0, and go to next step.

Step four, the axis X value of the right stick and the axis Y value of the right stick are sent to the game platform, which generated by the displacement sensor is simulated the right stick, then this process is done.

When the game controller of the present invention utilizes a FPS game which supported the mouse, the game controller of the present invention as the same aiming performance as the mouse, the aiming speed and accurateness is better than ordinary stick. When the game controller of the present invention utilizes a FPS game which supported stick, the work mode of the game controller is mode C, compare with ordinary stick has two advantage. One is the cursor has rapidly reflect speed. Ordinary stick used analog potentiometer, comprises a base and a control stick, controlling the moving speed of the cursor in the game by the control stick the degree of inclination, the stick is unstable. To control the instability of the stick, usually setting a middle death zone which locates in the middle of the base, the cursor of the game does not move when the control stick in middle death zone. (It is not necessary to need a left stick in the game controller, the game controller could only have right stick to control the cursor.) Only the control stick out of the death zone, the cursor start to move, in this way the aiming time is delay. But the displacement sensor has not the middle death zone, when moving the displacement sensor 201, the cursor also moving immediately. The other is the cursor can change direction immediately during the cursor moving rapidly. When the cursor is moving rapidly, the control stick locates the father away from the base centre, at this time, if the cursor need to move to opposite direction, the control stick need to move a long distance, and the control stick still need to pass the middle death zone, but utilizing the game controller of the present invention, no matter how the cursor current speed, pushes the displacement sensor less than 0.1 mm towards the direction which you wants the cursor moving, the cursor will move follow the direction.

The management system of the game controller of the present invention, comprises:

A processing module 302 and a communication module 303 which links with each other, wherein the processing module 302 process a displacement data, produces a formatted displacement data, so that a game platform can identify the formatted displacement data which links with the processing module 302, the formatted displacement data is sent to the communication module 303; the communication module 303 sends the formatted displacement data to the game platform which is processed by the processing module 302.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A game controller for a game, comprising:
a controller housing, wherein a plurality of function buttons is provided on said controller housing for operating a game character of said game;
a management module received in said controller configured to process data which is generated by said function buttons and processing Communication with a game platform of said game linked to said game controller;
a locating device linked to said management module configured to accurately locate said game character in said game, wherein said locating device defines a locating area and comprises a sliding frame mounted on said locating area, and a displacement sensor moving within said locating area and while an orientation of said displacement sensor is remained unchanged, wherein said sliding frame comprises a first guider track and two parallel second guider tracks, wherein said two guider second tracks are mounted on two opposite side edges of said locating area, wherein two ends of said first guider track are slidably connected with said two second guider tracks to form a "H" shape structure, so that said first guider track is able to move along said two second guider tracks, wherein said displacement sensor is slid along said first guider track such that said displacement sensor is freely moved within said locating area via a sliding movement between said displacement sensor and said first guider track and a sliding movement between said first and second guider tracks, and wherein said locating device further comprises a touch sensor switch mounted on said displacement sensor configured to control a working condition of said displacement sensor, such that said displacement sensor is activated when there is a touch of said touch sensor switch.

2. The game controller, as recited in claim 1, wherein said displacement sensor is a photoelectric sensor.

3. The game controller, as recited in claim 2, wherein said locating device further comprises a return device for ensuring said displacement sensor to be returned back to a middle initial position of said locating area, wherein said return device comprises a plurality of first resilient elements provided at said first guider track for applying forces to said displacement sensor to slide at a middle of said first guider track, and a plurality of second resilient elements provided at said second guider tracks respectively for applying forces to said first guider track to slide at a middle of each of said second guider tracks.

4. The game controller, as recited in claim 3, wherein said first resilient elements are provided at two ends of said first guider track respectively at a position that said displacement sensor is located between said first resilient elements such that said displacement sensor is pushed by said first resilient elements to slide at the middle of said first guider track, wherein said second resilient elements are provided at two ends of each of said second guider tracks respectively at a position that said first guider track is located between said second resilient elements, such that said first guider track is pushed by said second resilient elements to slide at the middle of each of said second guider tracks.

5. The game controller, as recited in claim 4, wherein said locating area is located at a right handle of said controller housing at a position that one end of said locating area is connected with a top surface of said right handle of said controller housing and another end of said locating area is extended out of said controller housing.

6. The game controller, as recited in claim 5, wherein said management module further comprises a processing module and a communication module interlinked with each other, wherein when said displacement sensor is moved, said processing module simulates a coordinate of said displacement sensor and collects displacement data therefrom to generate formatted displacement data, wherein said communication module receives said formatted displacement data and sends said formatted displacement data to said game platform.

7. The game controller, as recited in claim 2, wherein said first resilient elements are provided at two ends of said first guider track respectively at a position that said displacement sensor is located between said first resilient elements such that said displacement sensor is pushed by said first resilient elements to slide at the middle of said first guider track, wherein said second resilient elements are provided at two ends of each of said second guider tracks respectively at a position that said first guider track is located between said second resilient elements, such that said first guider track is pushed by said second resilient elements to slide at the middle of each of said second guider tracks.

8. The game controller, as recited in claim 2, wherein said locating area is located at a right handle of said controller housing at a position that one end of said locating area is connected with a top surface of said right handle of said controller housing and another end of said locating area is extended out of said controller housing.

9. The game controller, as recited in claim 1, wherein said locating device further comprises a return device for ensuring said displacement sensor to be returned back to a middle initial position of said locating area, wherein said return device comprises a plurality of first resilient elements provided at said first guider track for applying forces to said displacement sensor to slide at a middle of said first guider track, and a plurality of second resilient elements provided at said second guider tracks respectively for applying forces to said first guider track to slide at a middle of each of said second guider tracks.

10. The game controller, as recited in claim 1, wherein said locating area is located at a right handle of said controller housing at a position that one end of said locating area is connected with a top surface of said right handle of said controller housing and another end of said locating area is extended out of said controller housing.

11. The game controller, as recited in claim 1, wherein said management module further comprises a processing module and a communication module interlinked with each other, wherein when said displacement sensor is moved, said processing module simulates a coordinate of said displacement sensor and collects displacement data therefrom to generate formatted displacement data, wherein said communication module receives said formatted displacement data and sends said formatted displacement data to said game platform.

12. A locating device for a game controller having a controller housing to control a game, comprising:

a management module, the management module being received in said controller housing, and processing communication with a game platform of said game linked to said game controller;

a locating area defined on said controller housing;

a displacement sensor linked to said management module and being moved within said locating area for accurately locating a game character in said game, wherein an orientation of said displacement sensor is remained unchanged when said displacement sensor is moved within said locating area, and wherein a touch sensor switch is mounted on said displacement sensor configured to control a working condition of said displacement sensor, such that said displacement sensor is activated when there is a touch of said touch sensor switch; and a sliding frame, the sliding frame mounted on said locating area, comprising a first guider track and two parallel second guider tracks, wherein said two guider second tracks are mounted on two opposite side edges of said locating area, wherein two ends of said first guider track are slidably connected with said two second guider tracks to form a "H" shape structure, so that said first guider track is able to move along said two second guider tracks, and wherein said displacement sensor is slid along said first guider track such that said displacement sensor is freely moved within said locating area via a sliding movement between said displacement sensor and said first guider track and a sliding movement between said first and second guider tracks.

13. The locating device, as recited in claim 12, wherein said displacement sensor is a photoelectric sensor.

14. The locating device, as recited in claim 13, wherein said locating device further comprises a return device for ensuring said displacement sensor to be returned back to a middle initial position of said locating area, wherein said return device comprises a plurality of first resilient elements provided at said first guider track for applying forces to said displacement sensor to slide at a middle of said first guider track, and a plurality of second resilient elements provided at said second guider tracks respectively for applying forces to said first guider track to slide at a middle of each of said second guider tracks.

15. The locating device, as recited in claim 14, wherein said first resilient elements are provided at two ends of said first guider track respectively at a position that said displacement sensor is located between said first resilient elements such that said displacement sensor is pushed by said first resilient elements to slide at the middle of said first guider track, wherein said second resilient elements are provided at two ends of each of said second guider tracks respectively at a position that said first guider track is located between said second resilient elements, such that said first guider track is pushed by said second resilient elements to slide at the middle of each of said second guider tracks.

16. The locating device, as recited in claim 15, wherein said locating area is located at a right handle of said controller housing at a position that one end of said locating area is connected with a top surface of said right handle of said controller housing and another end of said locating area is extended out of said controller housing.

17. The locating device, as recited in claim 16, wherein said management module further comprises a processing module and a communication module interlinked with each other, wherein when said displacement sensor is moved, said processing module simulates a coordinate of said displacement sensor and collects displacement data therefrom to generate formatted displacement data, wherein said communication module receives said formatted displacement data and sends said formatted displacement data to said game platform.

18. The locating device, as recited in claim 13, wherein said first resilient elements are provided at two ends of said first guider track respectively at a position that said displacement sensor is located between said first resilient elements such that said displacement sensor is pushed by said first resilient elements to slide at the middle of said first guider track, wherein said second resilient elements are provided at two ends of each of said second guider tracks respectively at a position that said first guider track is located between said second resilient elements, such that said first guider track is pushed by said second resilient elements to slide at the middle of each of said second guider tracks.

19. The locating device, as recited in claim 13, wherein said locating area is located at a right handle of said controller housing at a position that one end of said locating area is connected with a top surface of said right handle of said controller housing and another end of said locating area is extended out of said controller housing.

20. The locating device, as recited in claim 12, wherein said locating device further comprises a return device for ensuring said displacement sensor to be returned back to a middle initial position of said locating area, wherein said return device comprises a plurality of first resilient elements provided at said first guider track for applying forces to said displacement sensor to slide at a middle of said first guider track, and a plurality of second resilient elements provided at said second guider tracks respectively for applying forces to said first guider track to slide at a middle of each of said second guider tracks.

21. The locating device, as recited in claim 12 wherein said locating area is located at a right handle of said controller housing at a position that one end of said locating area is connected with a top surface of said right handle of said controller housing and another end of said locating area is extended out of said controller housing.

22. The locating device, as recited in claim 12, wherein said management module further comprises a processing module and a communication module interlinked with each other, wherein when said displacement sensor is moved, said processing module simulates a coordinate of said displacement sensor and collects displacement data therefrom to generate formatted displacement data, wherein said communication module receives said formatted displacement data and sends said formatted displacement data to said game platform.

* * * * *